US010896389B2

(12) United States Patent
Sardonis et al.

(10) Patent No.: US 10,896,389 B2
(45) Date of Patent: Jan. 19, 2021

(54) WORKFLOW METHOD AND SYSTEM FOR STUDENT RETENTION MANAGEMENT

(75) Inventors: Elias Sardonis, Cambridge, MA (US); Melanie Strodtman, Lebanon, OH (US); Robert Stober, Hull, MA (US)

(73) Assignee: Jenzabar, Inc., Boston, MA (US)

( * ) Notice: Subject to any disclaimer, the term of this patent is extended or adjusted under 35 U.S.C. 154(b) by 295 days.

(21) Appl. No.: 13/045,257

(22) Filed: Mar. 10, 2011

(65) Prior Publication Data

US 2012/0233084 A1 Sep. 13, 2012

(51) Int. Cl.
| | | |
|---|---|---|
| G06Q 10/10 | (2012.01) | |
| G06Q 30/02 | (2012.01) | |
| G06Q 10/06 | (2012.01) | |
| G06Q 30/06 | (2012.01) | |
| G06Q 10/08 | (2012.01) | |
| G06Q 50/20 | (2012.01) | |

(52) U.S. Cl.
CPC ........... *G06Q 10/06* (2013.01); *G06Q 50/205* (2013.01); *G06Q 50/2053* (2013.01)

(58) Field of Classification Search
CPC ... G06Q 10/06; G06Q 50/205; G06Q 50/2053
USPC .................................................. 705/1.1–912
See application file for complete search history.

(56) References Cited

U.S. PATENT DOCUMENTS

| | | | |
|---|---|---|---|
| 4,787,036 A | 11/1988 | Fleming | |
| 7,082,418 B2 * | 7/2006 | Levy et al. | ..................... 706/12 |
| 7,266,340 B2 * | 9/2007 | Bresciani | ..................... 434/350 |
| 7,512,627 B2 | 3/2009 | Hossfeld et al. | |
| 7,937,416 B2 * | 5/2011 | Hossfeld et al. | ............ 707/803 |
| 2002/0178038 A1 | 11/2002 | Grybas | |
| 2004/0002040 A1 | 1/2004 | Foley et al. | |
| 2005/0282125 A1 | 12/2005 | Christensen et al. | |
| 2009/0083311 A1 | 3/2009 | Hossfeld et al. | |
| 2010/0009332 A1 | 1/2010 | Yaskin et al. | |

OTHER PUBLICATIONS www.jenzabar.com retrieved from www.archive.org any linkage Feb. 6, 2010.*
"Datatel Colleague Student Retention Alert," Datatel, Inc., 2010, Accessed Oct. 19, 2010, (http://www.datatel.com/products/products_a-z/retention_alert.cfm), 1 page.
"Datatel Colleague Student Retention Alert," Datatel, Inc., 2007, 2 pages.

(Continued)

*Primary Examiner* — Jonathan P Ouellette
(74) *Attorney, Agent, or Firm* — Houstonhogle LLP

(57) ABSTRACT

A retention management system identifies, analyzes, and evaluates student information collected by the enterprise resource planning systems and learning management systems. The retention management system applies an algorithm to collected information and locates students that are struggling before they are lost to attrition. The retention management system also provides tools to allow personnel at the academic institution to communicate with students, implement plans to correct current problems with student, and to predict and prevent future problems.

5 Claims, 26 Drawing Sheets

(56) References Cited

OTHER PUBLICATIONS

"Student Satisfaction Inventory™," Noel-Levitz, Inc., 1998-2009, Accessed Sep. 15, 2009, (https://www.noellevitz.com/student-retention-solutions/satisfaction-priorities-assessments/student-satisfaction-inventory), 2 pages.
"Student success and retention services," Noel-Levitz, Inc., 1998-2010, Accessed Oct. 19, 2010, (http://www.noellevitz.com/student-retention-solutions), 7 pages.
"Starfish Early Alert™ Overview: Early Warning and Student Tracking System," Starfish Retention Solutions, Inc., 2008-2011, Accessed Oct. 19, 2010, (http://www.starfishsolutions.com/sf/solutions/earlyalert.html), 4 pages.
Jenzabar's Retention Management Solution 1.0: Installation Guide, Jenzabar Inc., Jun. 29, 2009, 51 pages.
www.hobsons.com any linkage retrieved May 26, 2010 from www.archive.org.
"Technology helps increase retention and graduation rates one student at a time" by University Business Magazine, UB Custom Publishing group, Nov. 1, 2009, 4 pages.

\* cited by examiner

1404 — 8. Add Early Alert (To a student from within RMS)

Victor Wood > Add Early Alert

Add Early Alert for Victor Wood

1405 — If you have concerns about a student, our retention management team wants to know about them *as soon as possible*. Please use this form to let us know if you have any reason to fear a student's retention might be at risk.

| | |
|---|---|
| Your Relationship: | Faculty - Current |
| Concern Type: | Academic - Grades |
| Relevant Course: | None |
| Your Risk Assessment: | High |

Alert Notes/Details: [text box]

1406 — Your Intervention:    1403

- ◉ I have not contacted the student about this concern.
- ○ I have attempted to communicate my concern to the student but was unsuccessful and/or did not get a response.
- ○ I have communicated my concern to the student, but s/he did not agree it was an issue.
- ○ I have communicated my concerns to the student, and s/he has a plan in place to move forward.
- ○ I have worked directly with the student to create a plan for overcoming this issue.

Intervention Notes/Details: [text box]

[Submit Early Alert] [Cancel]

© 2010 Jenzabar, Inc

FIG. 14A

Add an Intervention for Victor Wood

If you have interacted with a student regarding a retention issue, please submit this report to keep our retention management team aware of all actions that have been taken.

Your Relationship: Faculty - Current
Concern Type: Academic - Grades
Relevant Course: None Your Intervention:
- ● I have not contacted the student about this concern.
- ○ I have attempted to communicate my concern to the student but was unsuccessful and/or did not get a response.
- ○ I have communicated my concern to the student, but s/he did not agree it was an issue.
- ○ I have communicated my concerns to the student, and s/he has a plan in place to move forward.
- ○ I have worked directly with the student to create a plan for overcoming this issue.

Intervention Notes/Details:

[ Submit Intervention ] [ Cancel ]

© 2010 Jenzabar, Inc

WORKFLOW METHOD AND SYSTEM FOR STUDENT RETENTION MANAGEMENT

RELATED APPLICATIONS

This is application is related to U.S. patent application Ser. No. 13/045,238, entitled "Method and System for Automatic Alert Generation in Retention Management System" and Ser. No. 13/045,269, entitled "System and Method for Determining Risk of Student Attrition", both filed on Mar. 10, 2011, both of which are incorporated herein by reference in their entirety.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Academic enterprise systems are used to manage student and business information at colleges, universities, high schools, and other academic institutions. The systems are used to manage student information such as enrollment, class registration, courses information, grades and financial aid information as well as business information such as payroll, room scheduling, professor course assignments, billing, and budgeting, to list a few examples.

Learning management systems are examples of academic enterprise systems and are sometimes referred to as content management systems, learning content management systems, managed learning environments, learning support systems, or online learning centers. Regardless of the name, the purpose is to provide web-based tools and strategies to supplement or replace traditional classroom learning and student management tools. The systems allow the institution's personnel, including administrators, faculty, and advisors, to update grades, assign online quizzes, track attendance, and create and monitor course groups. Likewise, the learning management systems can populate student and faculty accounts with courses, schedules, course descriptions, class lists, contact information and provide 24-hour access to course documents, announcements, links, syllabi, discussions, and online chat for students and the institution's personnel.

Similarly, business information is managed by academic enterprise resource planning (ERP) systems. The enterprise systems manage business information such as payroll, invoices, billing, budgeting, and other similar business functions required to keep an academic institution operational.

Academic institutions are always concerned with student attrition. When a student withdraws from an academic institution there is certainly a loss of revenue to the institution, but more importantly, it suggests a failure. As a result, personnel at many institutions are dedicated to engaging at-risk students in hopes of reducing attrition. In fact, retentions systems have been developed to identify at-risk students. Systems are available that access student grades in order to identify the students that are at-risk.

SUMMARY OF THE INVENTION

Many of the existing retention systems exist separate from the learning management and academic ERP systems that are common to academic institutions. This impairs their performance since they do not have access to all student data that might be relevant to identifying at-risk students. Moreover, it impairs the usability of the retention systems from the standpoint of the institutional personnel since they must learn and then access a new and separate system.

The present invention is directed to a retention management system. The retention management system analyzes the information collected by the enterprises resource planning systems and learning management systems and identifies critical factors that lead to the loss of students. The retention management system is able to evaluate students based on academic, financial, and social risk factors to determine which students are most in danger of attrition. The system is also able to manage the workflow associated with engaging at risk students and then tracking their progress.

In general, according to one aspect, the invention features a workflow method for student retention management. The method comprises enabling users to create alerts concerning retention issues for students and displaying the alerts to institutional personnel including types of the alerts and student names for the student for whom the alerts were created.

In embodiments, the types of the alerts include academic, financial and social types. More specific examples include academic grades and academic attendance.

The alerts are preferably displayed along with dates of creation, users submitting the alerts and relationships of the users to the students.

In the preferred embodiment, users can assign follow-ups for the alerts including designating assignee to perform the follow-ups. A status of the follow-ups are tracked as being pending or completed. Preferably, users can also add interventions with the students including specifying types of interventions performed.

In operation, users can select students and then display alerts associated with the students and also possibly follow-ups and interventions associated with the students.

In general, according to another aspect, the invention features a system for student retention management. The system comprises a user interface that enables users to create alerts concerning retention issues for students and a retention management system that displays the alerts to institutional personnel including types of the alerts and student names for the student for whom the alerts were created.

In general, according to still another aspect, the invention features a workflow method for student retention management. The method comprises enabling users to create interventions concerning retention issues for students and displaying the interventions to institutional personnel including specifying contact with the student for whom the interventions were created.

In general, according to still another aspect, the invention features a system for student retention management for managing interventions concerning retention issues for students.

In general, according to still another aspect, the invention features a workflow method for student retention management. The method comprises enabling users to create follow-ups concerning retention issues for students and displaying the follow-ups to institutional personnel including personnel designated to perform the follow-ups. This can also be characterized in terms of a system.

In general according to still another aspect, the invention features a method of generating alert messages in an academic retention management system. The method comprises retrieving and displaying student information, enabling selection of students, enabling the population of alert forms with information related to retention concerns with respect to the selected students, and submitting the alert forms to the retention management system to create corresponding alerts.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 7A shows the early alerts tab screen.

FIG. 7B shows the interventions tab screen.

FIG. 9 shows the student list tab screen.

FIG. 14A illustrates an example of an early alert submission form.

FIG. 14B illustrates an example of an intervention submission form.

DETAILED DESCRIPTION OF THE PREFERRED EMBODIMENTS

Figure 1:
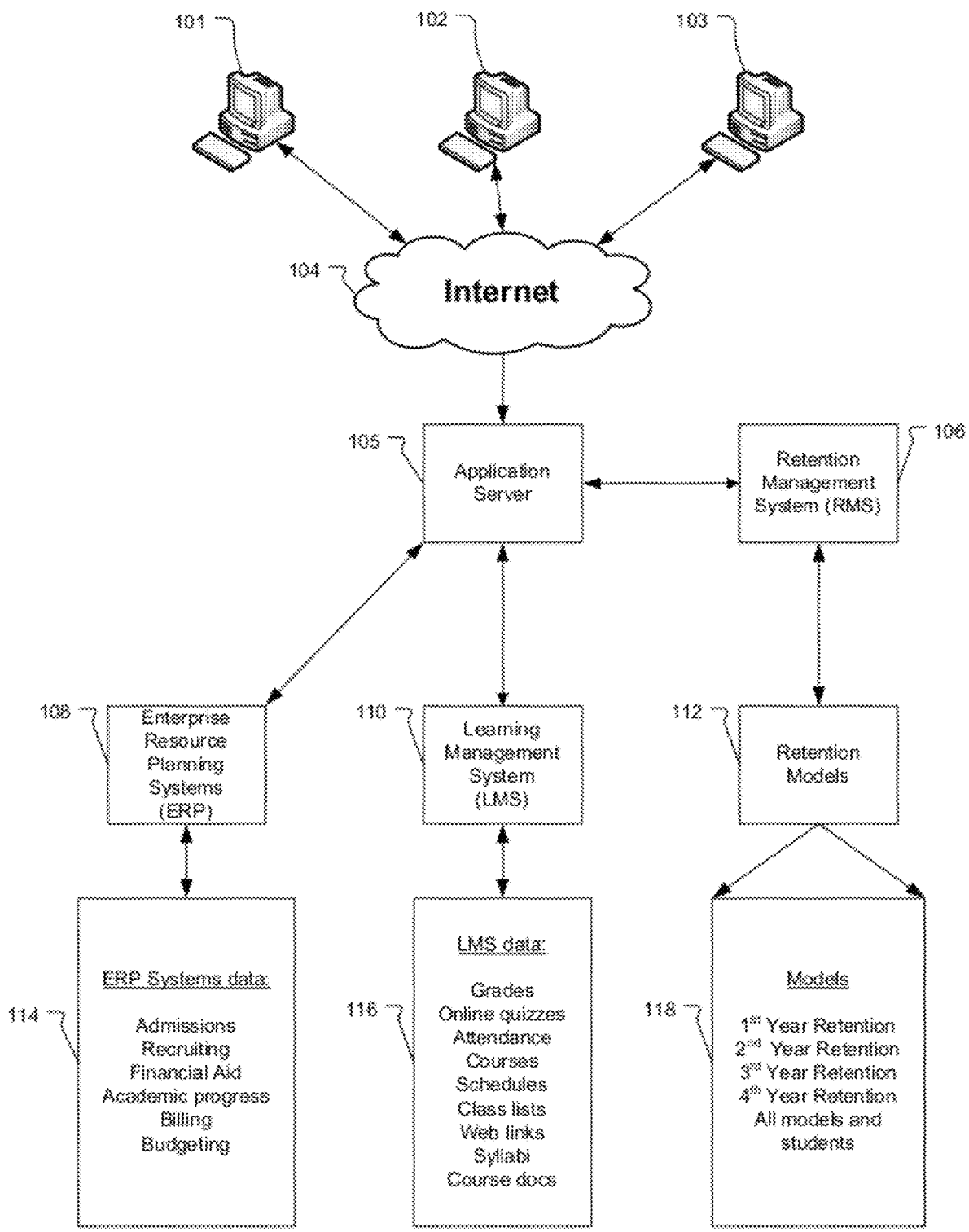
FIG. 1 is a block diagram showing academic enterprise systems and illustrating the relationships between the users, the application server, the management systems, and stored data.

FIG. 1 is a system diagram illustrating the relationships between the users 101, 102, 103, application server 104, data processing systems 106, 108, 110, and data sources 112, 114, 116, 118.

Users are divided into different categories such as students 101, institutional personnel such as administrators 102, and educators or instructors 103. These categories are divided into sub-categories. Students 101 include first through fourth year students, graduate students, and part-time students. Similarly, the administrators 102 are divided into sub-categories such as administrators specializing in financial, accounting, registration, retention managers, and admissions. The educators 103 are also divided into sub-categories such as department heads, professors, teaching assistants, tutors, etc.

In a typical implementation, users 101, 102, 103 access an application server 105 from desktop or mobile computing devices, such as workstations, portable computers, mobile computers or mobile phones, via a communications network 104. The computing devices each commonly have a user input device, such as keyboard, video monitor, and central processing unit. The communications network is a packetized public network such as the Internet. Typically, the communication network also includes private networks such as university or enterprise networks and/or mobile cellular telecommunications networks. The computers operated by the users display the graphic user interface on the display devices of the computers. The interface is illustrated and describe herein with respect to FIGS. 4-22.

The application server 105 receives requests initiated by users 101, 102, 103 from the computing devices and manages these requests based on the users' predefined permission level. Users are granted different levels of access to the different systems based on their role within the university. For example, professors are granted access to students' grades for the student they teach, but are not necessarily granted access to grades of students they do not teach. Likewise, the professors are typically not granted access to any financial aid information for any students. Conversely, financial aid managers are granted access to financial aid information for all students, but are not granted access to any grades. FIGS. 19-22 show example of how users' permission levels are configured based on their role within the university.

Different types of information are stored and managed by different systems 106, 108, 110. This segmented approach allows the multiple systems to be integrated, removed, replaced, upgraded, or combined with other systems with minimal disruption to the other systems, users, or overall network.

The retention management system (RMS) 106 provides tools and resources to identify factors that lead to student attrition. The RMS 106 helps identify the students who are at risk for attrition as well as the reasons why they are risk. Additionally, the RMS 106 provides insights and a workflow to guide users with early alert, intervention, and follow-up strategies. The RMS 106 supports different retention or prediction models 112, 118 for different student populations and provides tools for reporting and handling retention issues.

Additionally, the RMS 106 correlates and analyzes critical campus data and delivers a complete, overview of at-risk students. The RMS 106 mines data from the learning management system (LMS) 110 and academic enterprise resource planning (ERP) system 108 and applies retention algorithms to eliminate the unnecessary information so that retention managers can understand the risk and retention factors that lead to student attrition. The result is a proactive and predictive student retention management system that enables schools and universities to focus resources where they will have the greatest impact.

The ERP 108 is used by the academic institution to manage student and business information related to the operation of the academic institution.

The student information stored in the academic ERP system 108 is often managed by a number of components. The admissions components of ERP system are used to manage student admissions, from identifying and recruiting candidates to automating the admissions processes by tracking prospects, importing student data, and analyzing and generating candidate information reports. They are used to manage admissions communications, organize candidate information, schedule recruiting visits and interviews, manage recruitment data, and track students from admissions to registration. Financial aid components of the ERP system have the ability to generate financial aid packages and awards, process disbursements and adjustments, process work-study funds, track academic progress, enable authorized administrators to view financial aid data, and facilitate compliance with federal guidelines. Registration components of the system manage enrollment data and course registration, generate catalogs, determine space availability, course conflicts, course pre-requisites, and non-course pre-requisites. Additional components are often available that cover student life such as student activities, residence assignment, violations and sanctions, advising, and alumni development and advancement activities.

The business information in the academic ERP system 108 is also managed by a number of components. For example, accounts payable components typically provide vendor profiles and generate annual vendor reports, invoices and purchase orders. General ledger components cover automated billing for student tuition and room and board, manage payment plans for student payments, manage in-house loans to students, and track and record student payments to the institution. The components also automate the budgeting process, enable the management of fixed assets, and cover payroll, personnel and other human resource functions.

The learning management system (LMS) 110 provides web-based tools and strategies to supplement or replace traditional classroom learning, meeting the demand for online learning and distance education. The LMS data source 116 allows faculty to update grades, assign homework, assign quizzes, track attendance, and create and monitor course groups from any computer or mobile device with Internet access. Additionally, the LMS data source 116 populates the respective student and faculty accounts with their courses, schedules, course descriptions, class lists, and pre-populated grade books. The LMS also provides 24-hour access to course documents, announcements, web links, syllabi, threaded discussions, and real-time chat.

In the preferred embodiment, the RMS system 106 uses information from both the LMS 110 and the ERP 108 to first identify the at-risk students, and then disseminate this information among selected institution personnel. Workflows associated with engaging and addressing the problems of these students can then be defined and managed. This allows the institution to function in a proactive manner to minimized attrition and deploy resources to help those students that need it.

In terms of implementation, the ERP 108, LMS 110, RMS 106 and application server 105 are implemented on one or more physical server computers, which typically include one or more microprocessors, volatile memory, and non volatile memory. In other embodiments, the ERP 108, LMS 110, RMS 106, and application server 105 are implemented in a cloud computing system and deployed over virtual server computers. The ERP data 114, LMS data 116, and retention models 112 are stored in database systems such as SQL databases on data storage devices usually including RAID systems.

Figure 2:
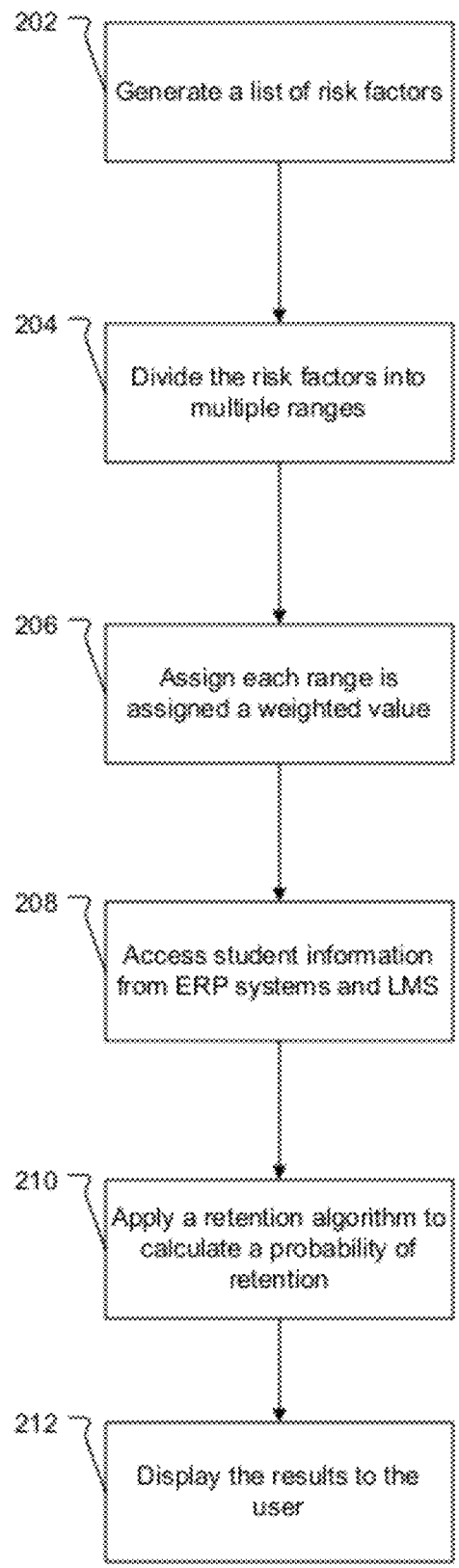
FIG. 2 is a flow chart illustrating the operations performed by the retention management system (RMS).

FIG. 2 is a flow chart illustrating the operations performed by the retention management system 106.

In the first step 202, the RMS 106 generates a list of risk factors, which are also referred to as retention factors. The risk or retention factors are critical factors that are used to determine the likelihood of retention for students during their college career. Some examples of risk factors are attendance at classes accessed from the LMS 110, grade point average (GPA) accessed from the LMS 110, late payment information accessed from the ERP 108, health concerns/issues accessed from the ERP 108, mid-term grades accessed from the LMS 110, final exam grades accessed from the LMS 110, and/or violations of school rules accessed from the ERP 108.

In some embodiments, these risk factors are identified using a data mining approach that looks at past history to determine which factors or data residing in the LMS 110 and ERP 108 are related to or indicative of future student attrition. In other examples, regression analysis is used to determine what information in the LMS 110 and the ERP system 108 is predictive of subsequent student attrition or not using historical data.

Figure 5:
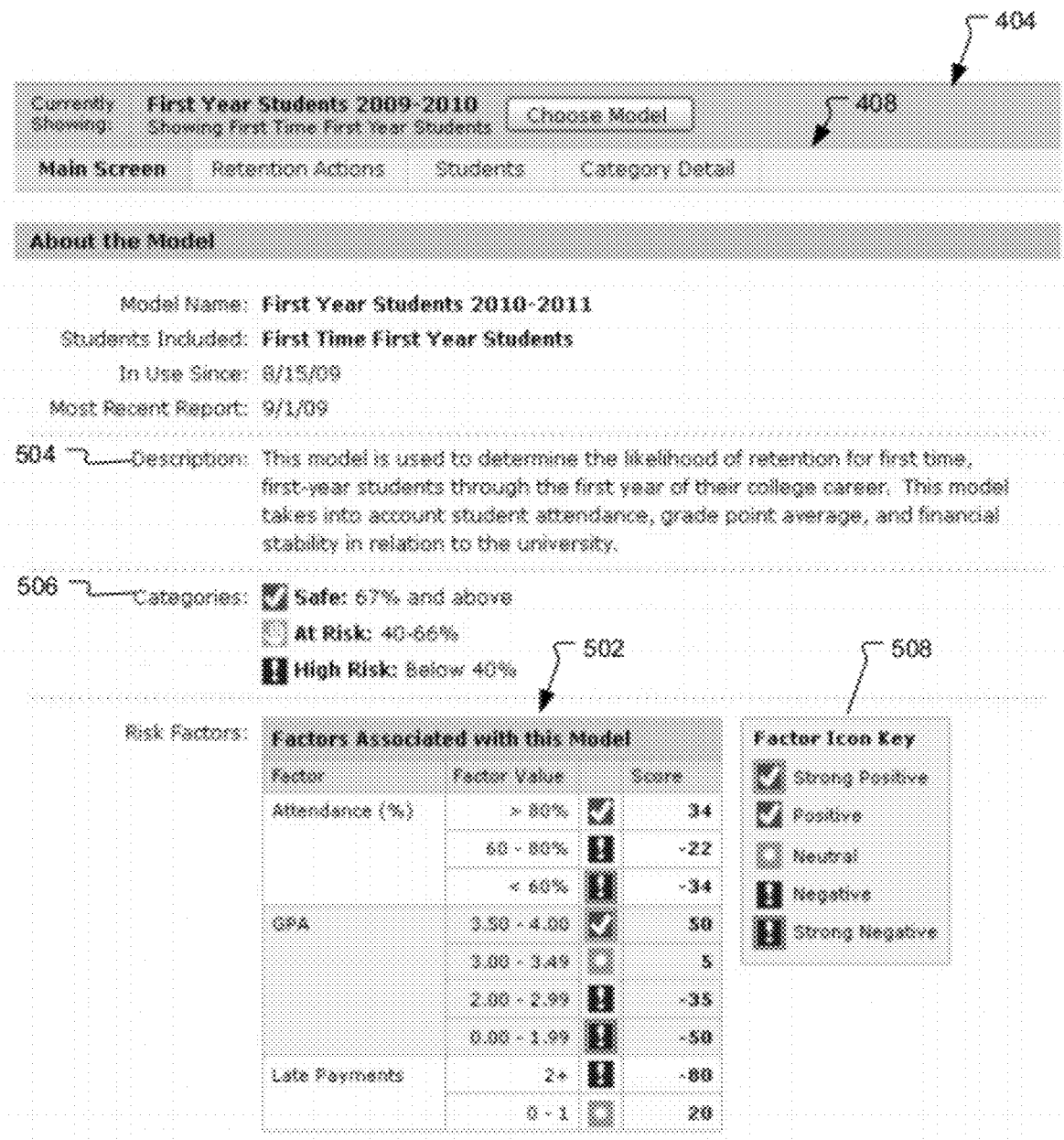
FIG. 5 shows a screen presenting an example of risk factors associated with a retention model.

In the next step 204, the risk factors are divided into multiple ranges. The multiple ranges separate the risk factors into different risk levels that correspond to the probability of retention. In the next step 206, the RMS 106 assigns a weighted value to each of the multiple ranges. The weighted value or score corresponds to the range's importance as a risk factor and this completes the retention model. FIG. 5. Illustrates an example of a retention model with risk factors divided into multiple ranges and with weighted values (score) assigned to each range.

In the next step 208, the RMS 106 retrieves the current student information from the ERP 108 and LMS 110. The RMS 106 applies a retention algorithm based on the retention model 112 to calculate the probability of retention for each student in step 210. Lastly, the results of the retention algorithm are displayed to the user in step 212.

Figure 3:
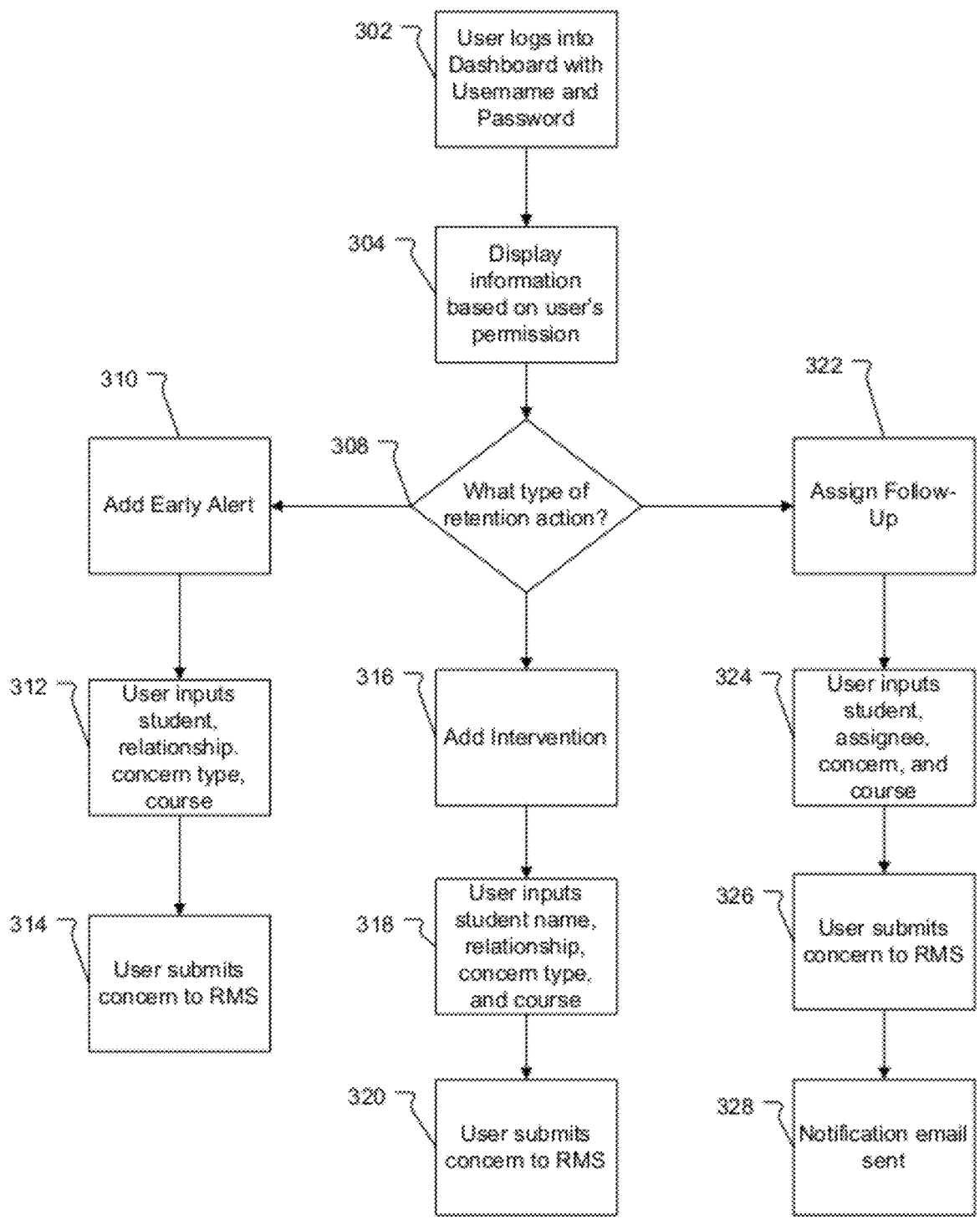
FIG. 3 is a flow chart that illustrates the steps for a user to manually create an early alert, intervention, or assign a follow-up.

FIG. 3 is a flow chart illustrating the steps for a user to manually create an early alert, intervention, or assign a follow-up to thereby create and update a workflow for institutional personnel to address the at-risk students at the institution.

In the first step 302, users log into the main screen with a username and password. Typically this is a main portal hosted by the applications server 105. Screens of the RMS are typically organized as a portlet and are displayed to the user based on their permission level in step 304. For example, professors are presented with retention information concerning the students in their classes whereas financial aid managers are presented retention information concerning students in financial trouble or the students with which they are tasked to monitor.

In the next step 308, the user selects the type of retention action to perform. The user is able to add an early alert in step 310, add an intervention in step 316, or assign a follow-up in step 322.

If the user selects the 'Add Early Alert' option in step 310, then the user enters the student name, the relationship of the person creating the alert, the concern type, the relevant course, the risk assessment and other alert notes in step 312. In the next step 314, the early alert is submitted to the RMS 106.

If the user selects the 'Add Intervention' option in step 316, then the user enters the student name, relationship to the student, concern type and relevant course in step 318. In the next step 320, the intervention is submitted to the RMS 106. Typically, the intervention is created after an early alert has been submitted or in conjunction with the creation of an early alert.

If the user selects the 'Assign Follow-Up' option in step 322, then the user enters the student name, the assignee (i.e., individual that is designated to follow-up with the selected student), the concern type, and the relevant course in step 324. In the next step 326, the follow-up is submitted to the RMS 106. Lastly, in step 328, a notification email is sent to the assignee. A follow-up is generally assigned after the intervention because the follow-up provides continued monitoring of the potential problem identified by the early alert and the retention action performed by the intervention.

Figure 4:
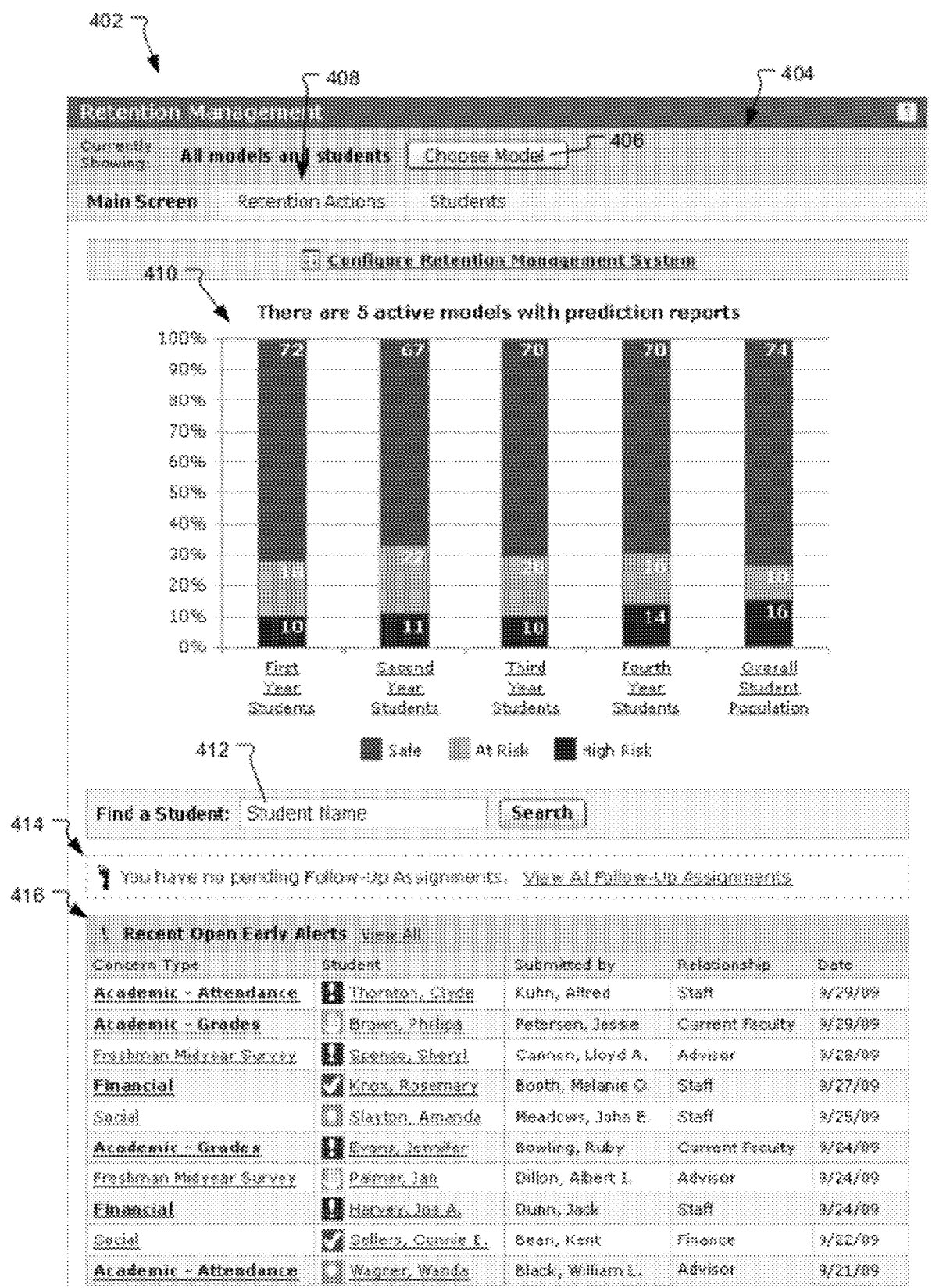
FIG. 4 shows an exemplary main screen that is presented to a user after they access the RMS.

FIG. 4 shows an exemplary main screen 402 that is presented to a user after they access the RMS 106 via the application server 105. The main screen 402 is a dashboard that provides navigation to the other tab screens in the RMS portlet.

The model selection bar 404 displays the selected prediction model, all students, or all students who are not part of any model. Selecting the 'Choose Model' button 406 replaces the model name with a pull-down box for choosing a different model and replaces the 'Choose Model' button with a 'View' button (not shown). Choosing a new model and clicking the 'View' button reloads the main screen 402 to display the new model and data for it.

In the illustrated example, models and the results for each model are provided for each of the first-fourth year students. The risk factors, the ranges, and the weighted values assigned to each risk factor are different for students in each of the years. This allows each of the models to be optimized for each sub-population.

The top navigation bar 408 displays up to 4 links for the main screen tab, retention actions screen tab, and students screen tab, and for users using model-based navigation, category detail screen tab. The portlet has two navigation models: student-based and model-based. The student-based navigation is typically recommended for faculty, staff, and advisors because the users are presented with information about students, retention actions, and performed actions independent of retention models. Conversely, model-based navigation is typically recommended for retention managers and administrators because the users are able to select a specific retention model, then view the students and data for that model.

The model area 410 displays summary graphs of all retention models that have been run. The name of each retention model is listed below the bars of the graph and is linked to a tab screen displaying that model. If a user selects the option to see 'all students who are not part of a model', the selected students are displayed, but the RMS 106 does not display a graph. The main screen 402 also includes a 'Find a Student' search bar 412 that allows users to search for specific students by name.

The recent follow-up assignments table 414 displays the ten most recent pending follow-ups assigned to the viewing user. If there are no pending follow-ups assigned to the user, the message, "You have no pending Follow-Up Assignments" is displayed. The recent open early alerts table 416 displays the most recently submitted early alerts that are still pending. If there are no open or pending early alerts, the message, "You have no pending Early Alerts" is displayed.

FIG. 5 shows an example of risk factors associated with a retention model. The risk factors table 502 shows the type of risk factors, the ranges for the risk factors (factor values), and the weighted value (score) assigned to each range. A brief description 504 of the retention model provides general explanation of the factors associates with the model. The categories section 506 displays the risk categories for the selected model. In the illustrated example, the categories are Safe, At Risk, and High Risk. In alternatives embodiments, there could be many more or less categories.

A student's total score is calculated by retrieving the student information that corresponds to the risk factors of the selected model, determining which range the student falls in, and summing the scores associated with range. Then, based on the total of the weighted scores, students are placed into one of the risk categories 506.

In the illustrated example, attendance and GPA from an LMS system data 116 are used in conjunction with payment information from the ERP system data 114. Ranges are assigned for each of the risk factors. For example, ranges of >80%, 60-80%, and <60% are defined in the model. Each of these ranges, has a corresponding score or weighted value that is used to calculate the score provided by the model.

The Factor Icon Key 508 provides a visual reference to illustrate the strength (positive or negative) of the risk factors. For example, a high GPA is strong positive indicator that suggests the student is safe, while two or more late payments is a strong negative indicator that suggests the student is in danger of attrition.

Figure 6:
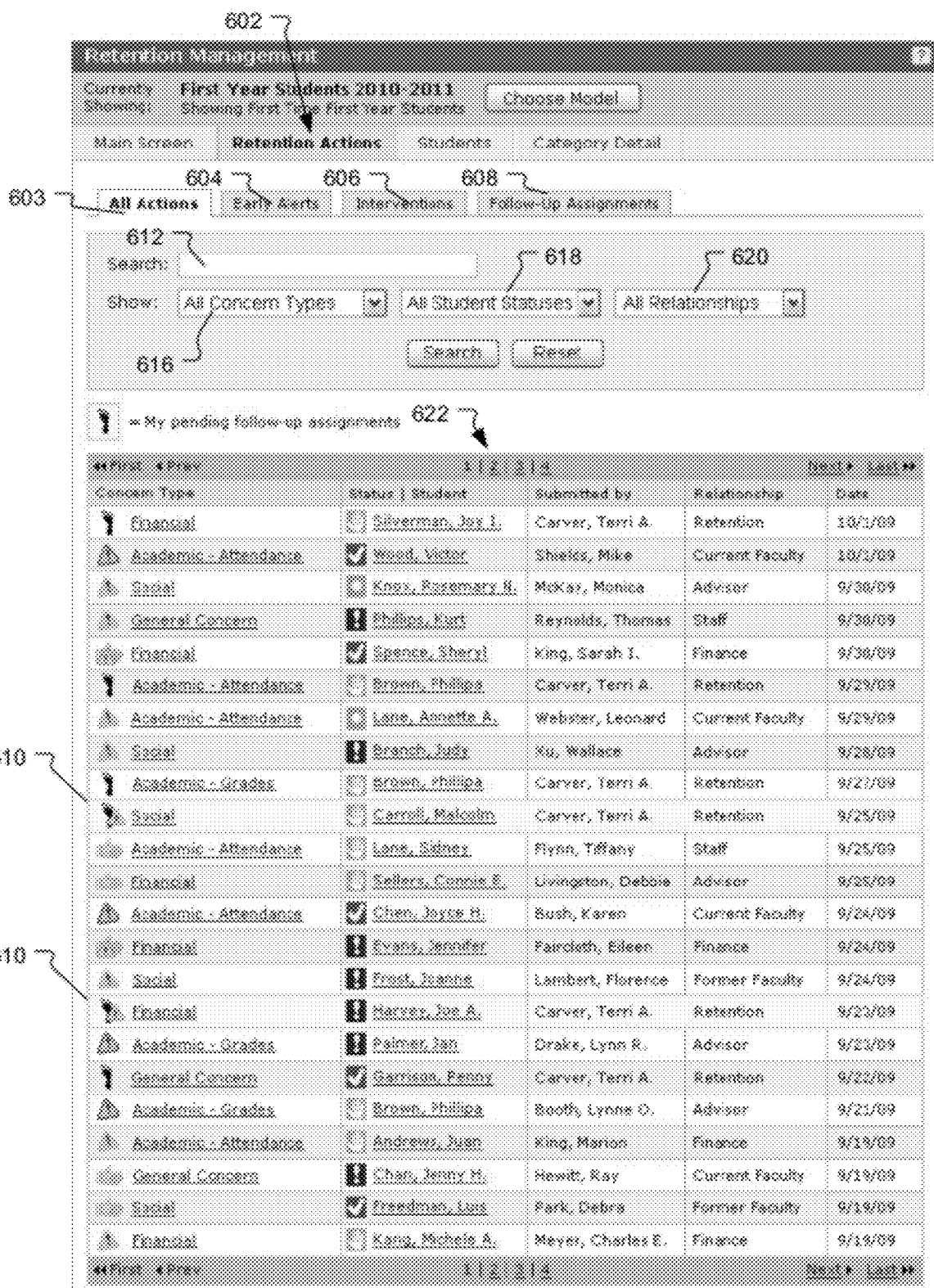
FIG. 6 shows the retention action tab screen.

FIG. 6 shows the retention action tab screen 602. The retention action tab screen is comprised of a series of tab screens that allows a user to navigate to the all actions tab screen 603, early alerts tab screen 604, interventions tab screen 606, and follow-up assignments tab screen 608. Typically, the retention actions tab screen 602 default view is of the all actions tab screen 603. The all action tab screen 603 is a compilation of all information that is sorted by concern type in the other tab screens 604, 606, 608.

The all action tab screen of retention actions tab screen 602 includes a search field 612 that allows users to search by student name or message description. The tab screen further includes filters 616, 618, 620 that allow users to filter student names presented in the table of actions 622. The filters allow the user to sort the results by concern type 616, student statuses 618, or relationship 620.

Additionally, any follow-up assignments assigned to the user 610 are highlighted in the table of actions 622. A further explanation of the filters 616, 618, 620 and the table of actions 622 is provided in Table I below.

TABLE I

| | |
|---|---|
| All Action tabs | A tab set that lets you choose between viewing All Actions, or just a specific type: Early Alerts, Interventions, or Follow-Up Assignments. |
| Search | Searches student name and message description. |
| Show | Dropdown menus to filter the list based on certain criteria, depending on what action type(s) are chosen with the action type tabs. The "All" value is the default for each of them. Show pull-down menus should be listed in the same order that the criteria display in the table below. |
|     Concern Type | Filters by the warning type of the action. Includes: "All Messages" and then one for each of the available types. |
|     Risk Assessments | Displays only when showing only Early Alerts. Filters by the risk assessment of the Alert as set with the Risk Assessment pull-down by the submitting user. "All Risks" "High Risk" "Moderate Risk" "Low Risk" "Unsure" |
|     Statuses | Filters by student retention score. Includes: "All Students" "High Risk Students" "At Risk Students" "Safe Students" "Unscored Students" |
|     Relationships | Filters by the relationship indicated in the Alert or action. Includes: "All Relationships" and then one for each of the available relationships. |
|     States | When viewing Early Alerts only, includes: "All States" "Open" "Closed" When viewing Follow-Up Assignments only, includes: "All States" "Pending" "Closed" |
|     Assigned to | When viewing Follow-Up Assignments only. Includes: "Assigned to everyone" "Assigned to me" |
| Table of actions | The table of actions, sorted by submission date except for Follow-Up Assignments which should be sorted first by Pending to Closed, then by date and Early Alerts which should be sorted by Open to Closed, then by date. This is paginated after 50 messages. |
|     Concern Type | The concern type chosen when submitting the action. If an action (Follow-Up Assignment or Intervention) is submitted from an Early Alert, this is the concern type of that parent Alert. Early Alerts that are submitted with any Risk Assessment other than "High Risk" display with an exclamation sign icon. Early Alerts that are submitted with a Risk Assessment of "High Risk", the alert should display with a red outlined icon. Interventions added directly to a student display with a hand icon. Interventions that have been added to Early Alerts, the concern type displays with a hand icon with an exclamation sign over it. For Interventions that were added to an Early Alert the concern type links to the Early Alert and anchors down to the specific intervention on that screen that was listed on this screen. Follow-Up Assignments added directly to a student display with a foot icon. Follow-Up Assignments added to an Early Alert display with a foot icon with an exclamation sign over it. All concern types (except Interventions added to an Early Alert - described above) link to the view action screen for whichever type of action is being listed. |
|     State | Displays only for Early Alerts and Follow-Up Assignments. For Early Alerts, the state can be either Open or Closed. For Follow-Up Assignments the state can be either Pending or Closed. Open or Pending display with a green dot icon, Closed displays with a light gray 'X' icon. |

TABLE I-continued

| | |
|---|---|
| Status \| Student | The student's retention category status icon, and their name as a link to the Student Detail screen. Each header controls the sort order separately if clicked. |
| Submitted by | The name of the user who submitted the Alert or Intervention |
| Relationship | The relationship indicated in the Alert or action. |
| Assigned to | When viewing the Follow-Up Assignments tab only. The name of the person assigned to follow up with the student. |
| Date | The submission date. |
| Highlighted rows | When viewing All Actions or Follow-Up assignments, any pending Follow-Ups assigned to the user viewing the portlet should be displayed with a dark yellow border and light yellow background. |

Figure 7A:
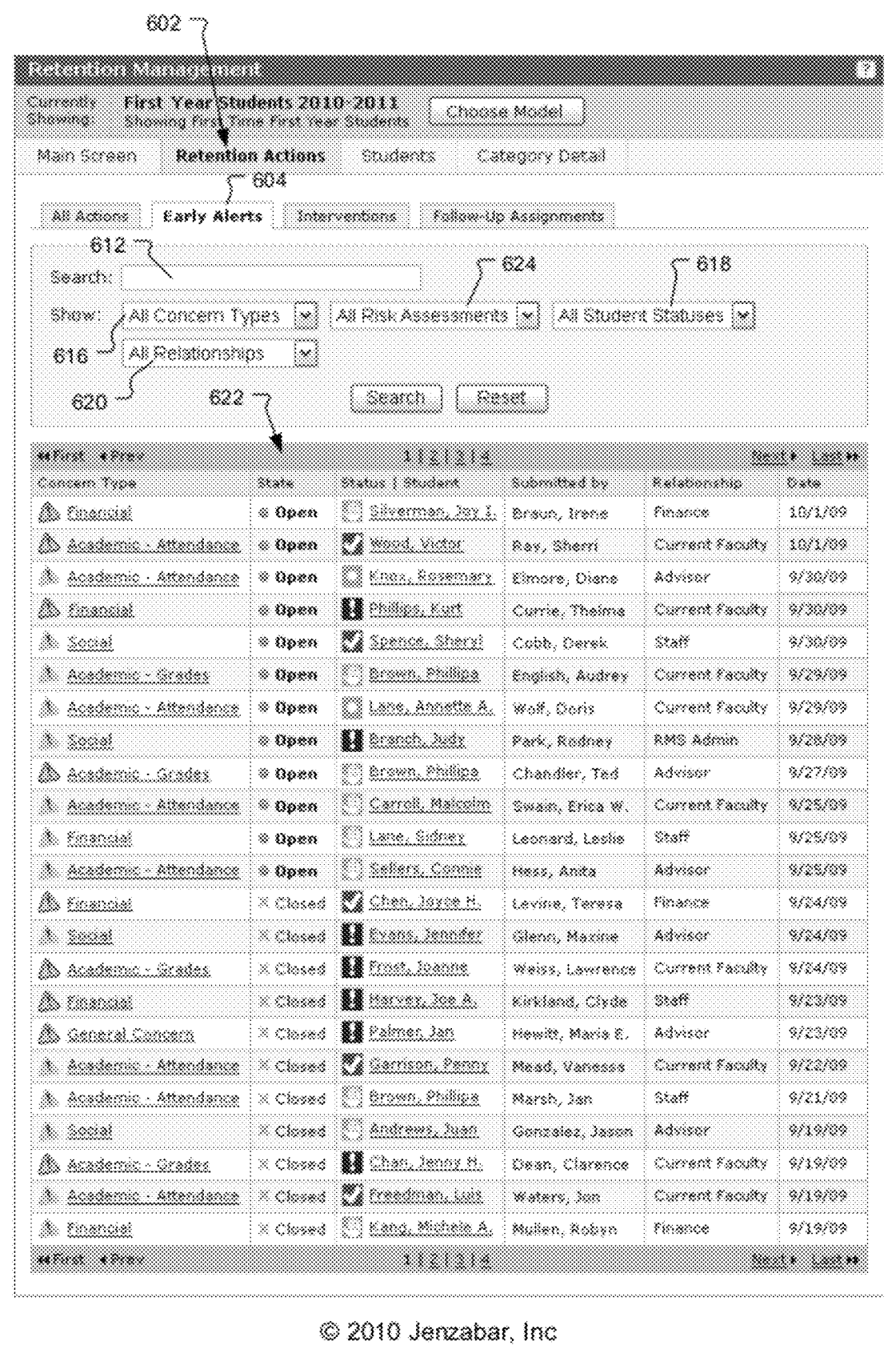

FIG. 7A shows the early alerts tab screen 604. The early alerts tab screen 604 is similar to the all actions tab screen 603 of the retentions action screen 602, but this tab screen only shows early alerts that are assigned to the user, are within the selected retention model, and are within the user's permission level. From this tab screen the user is able to see the pending and closed alerts. Additionally, the user is able to view an early alert for student or view the student's retention profile by selecting the appropriate link in the table of actions 622.

The early alerts tab screen 604 includes a search field 612 to search the RMS 106 by student names or message description. The early alerts tab screen 604 further includes filters 616, 618, 620, 624 that allow the user to filter the student names presented in the table of actions 622. In a typical implementation, the early alerts tab screen 604 allows a user to filter by concern type 616, student statuses 618, relationship 620, and risk assessment 624.

Figure 7B:
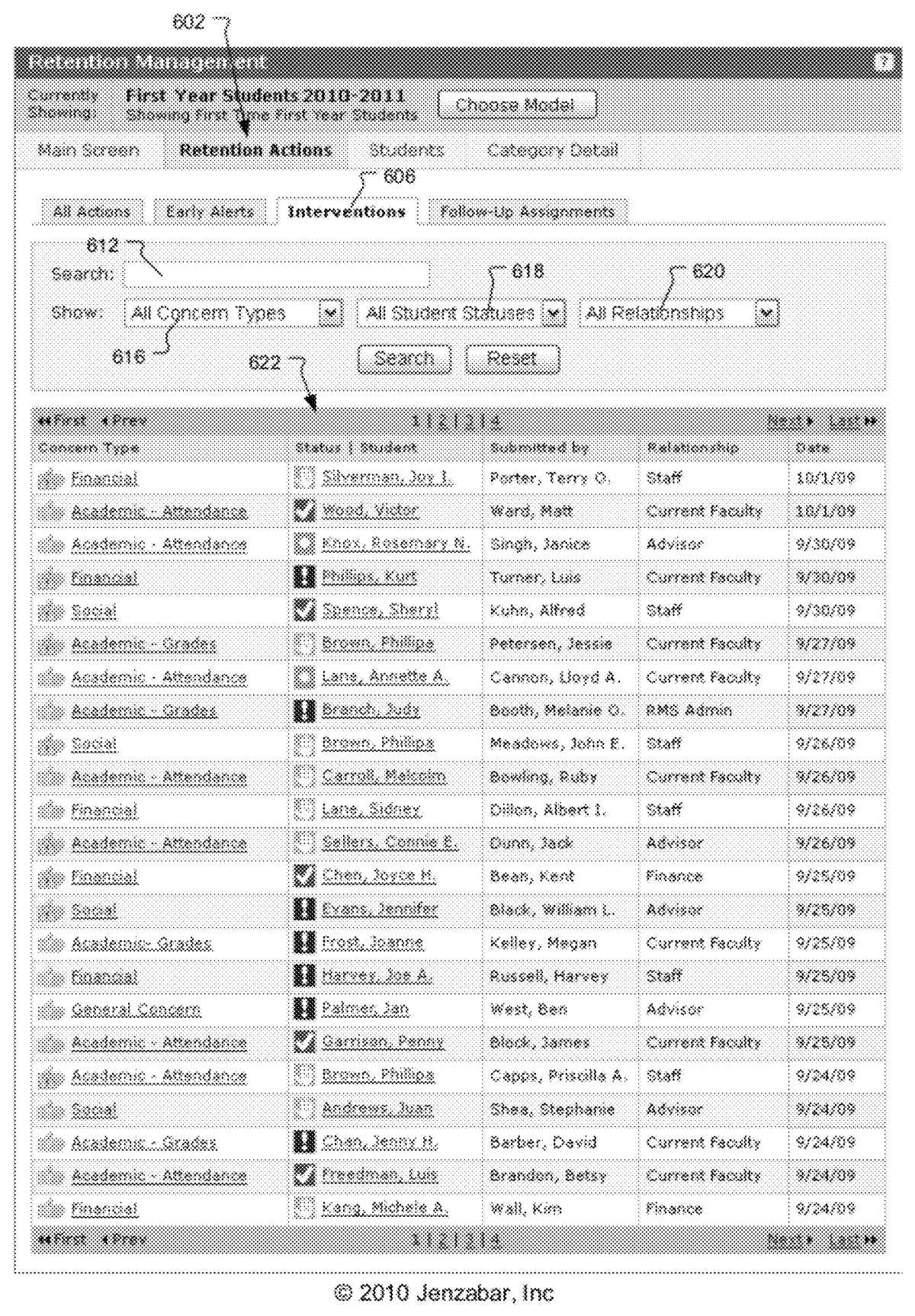

FIG. 7B shows the interventions tab screen 606. Interventions record interactions between institutional personnel and the students that relate to the students' continued attendance in order to avoid attrition. Interventions include face-to-face meetings, email communications, telephone conversations, and written communications directed at the at-risk student. The system allows these communications to be recorded and associated with the students in order to provide a record of the actions taken to prevent attrition.

The interventions tab screen 606 shows the interventions actions viewable by the user based on the selected retention model, students within the model, and the user's permission level. From this tab screen the user is able to see pending interventions. Additionally, the user is able to view an intervention or view the student's profile by selecting the link in the table of actions 622. For each intervention listed, the concern type, student name, the institutional personnel performing the intervention, their relationship and the date are displayed.

The interventions tab screen 606 includes a search field 612 to search the RMS 106 by student names or message description. The interventions tab screen 606 further includes filters 616, 618, 620 that allow the user to filter the information presented in the table of actions 622. In a typical implementation, the interventions tab screen 606 allows a user to filter by concern type 616, student statuses 618, and relationship 620.

Figure 7C:
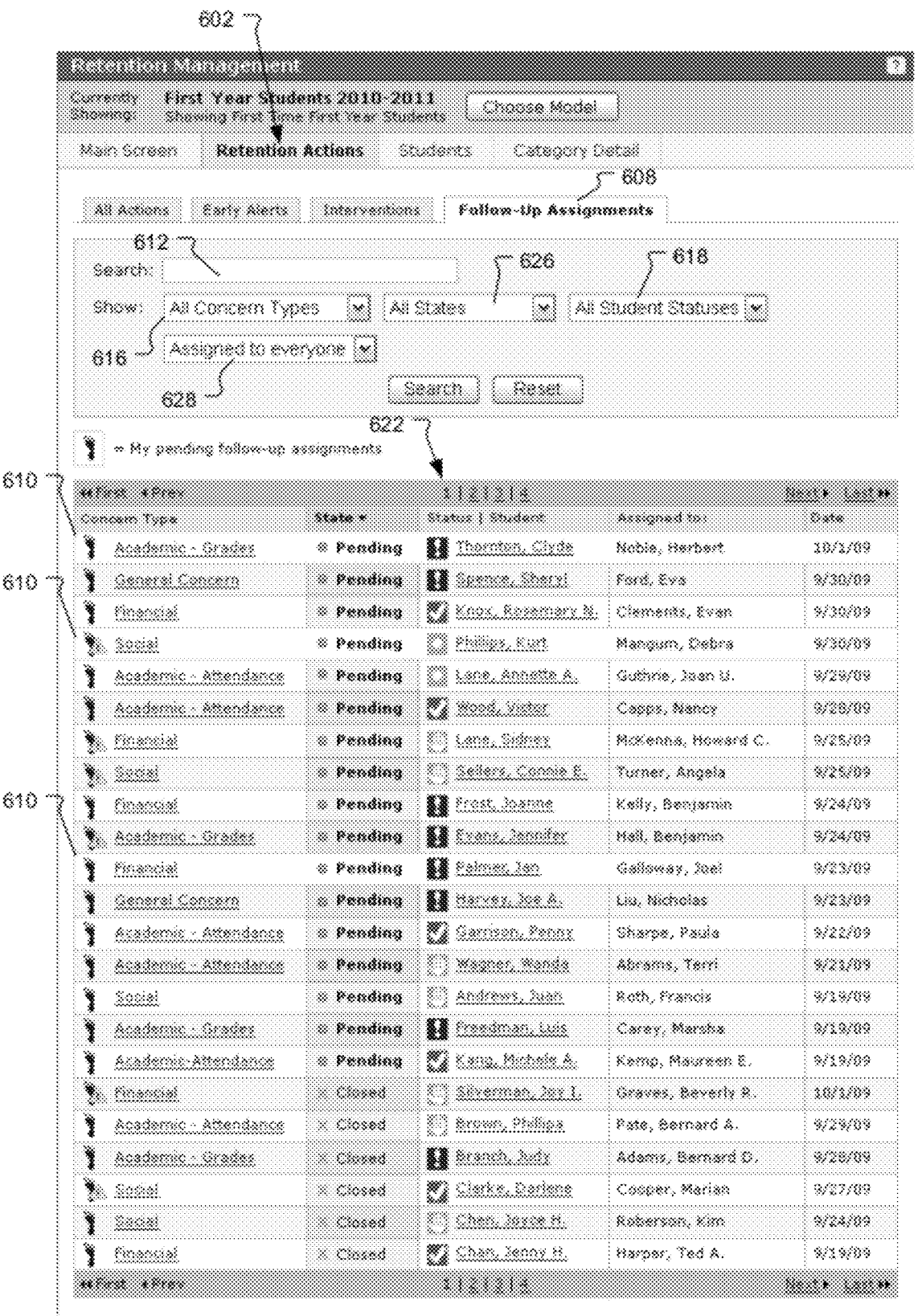
FIG. 7C shows the follow-up assignments tab screen.

FIG. 7C shows the follow-up assignments tab screen 608. The follow-up assignments tab screen 608 shows the follow-up actions assigned to the institutional personnel based on the selected retention model, students within the model, and the user's permission level. From this tab screen a user is able to see the current pending and closed follow-ups. Additionally, the user is able to view a follow-up or view the student's profile by selecting the link in the table of actions 622.

Follow-ups are assigned automatically by the system or by personnel assigned to handle retention issues by the institution. They are assigned to other institutional personnel who typically have a relationship with the at-risk student. Follow-ups include face-to-face meetings, email communications, telephone conversations, written communications directed at the at-risk student by the assignee. The system allows these communications to be recorded and associated with the students in order to provide a record of the follow-up actions taken to prevent attrition.

The follow-up assignments tab screen 608 includes a search field 612 to search the RMS 106 by student names or message description. The follow-up assignments tab screen 608 further includes filter options 616, 618, 626, 628 that allow the user to filter the information presented in the table of actions 622. Typically, the follow-up assignments tab screen 608 allows a user to filter by concern type 616, student states 626, student statuses 618, and assigned to 628. Similar to the retention action main screen 602, any follow-up assignments assigned to the user 610 are highlighted in the table of actions 622.

Figure 8:
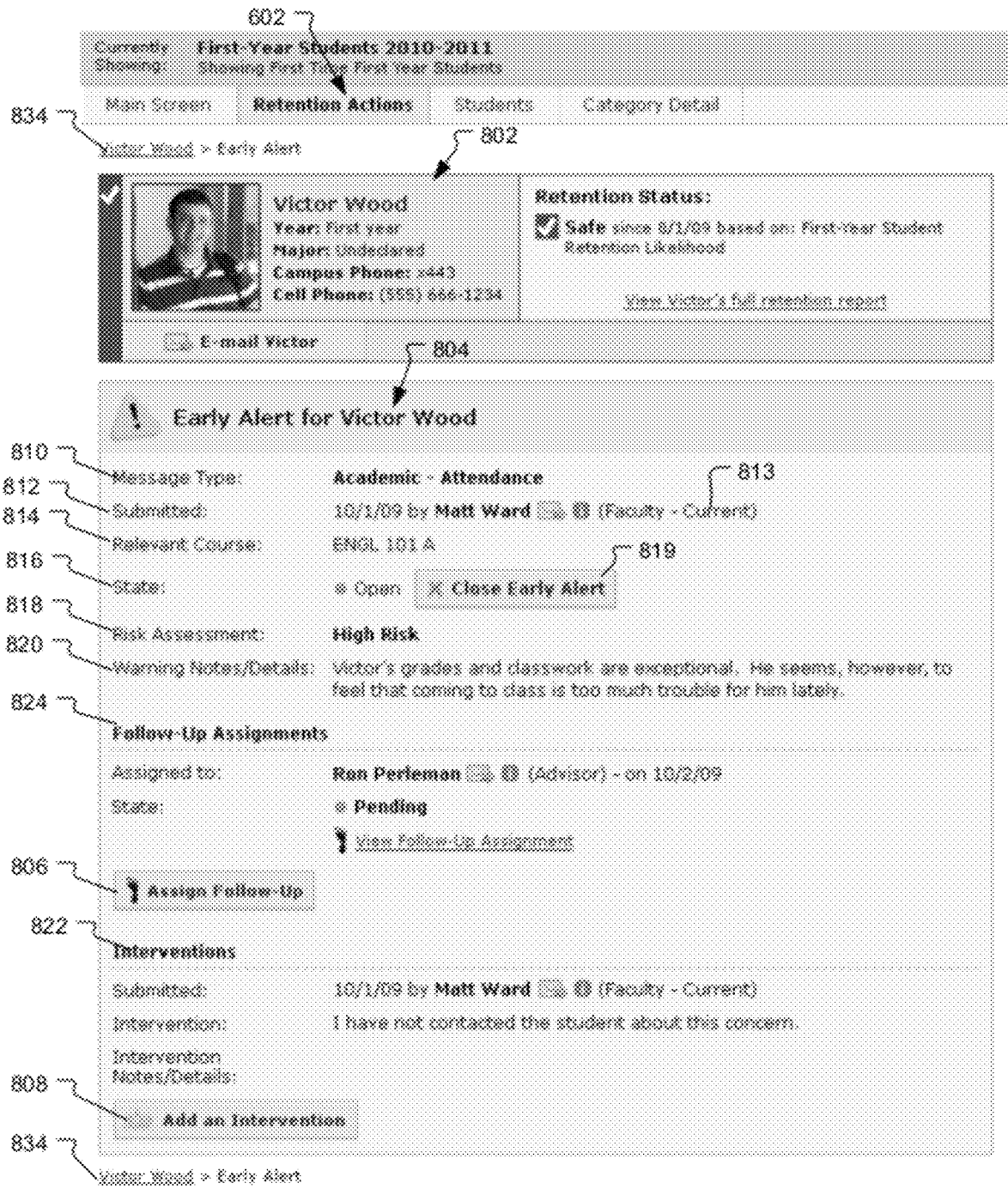
FIG. 8 shows an example of an early alert screen.

FIG. 8 illustrates an example of an early alert screen 804. The retention management system 106 provides a student overview 802 that includes a photo of the student (when available) and personal information such as name, school year, major, campus phone extension, mobile phone number, email address, and current retention status. In alternative embodiments, other information such as age, date of birth, and marital status are also presented.

When viewing an early alert for a student the retention action tabs 604, 606, 608 (see FIGS. 6, 7A-7C) are not displayed to avoid confusion and prevent users from unintentionally navigating to another tab screen or accidentally adding interventions and assigning follow-ups for the student. Separate links are presented, however, within the early alert screen 804 that allows the user to add interventions 808, assign a follow up 806, or close the early alert 819.

The early alert screen 804 provides detailed information including why the alert was created 810, the date and who created the alert 812, the relationship to the student 813, the relevant course 814, the current state of the alert 816, the risk assessment of the alert 818, and any additional notes 820 added by the submitter. Further, the interventions section 822 and the follow-up assignments section 824 displays any interventions or follow-ups associated with the early alert.

Additionally, breadcrumbs 834 are displayed at the top and bottom of the screen to aid in the navigation of the many screens of the user interface. The breadcrumbs 834 provide users a way to track their location within the many tab screens of the portlet. Further explanation of the early alert screen 804 is provided in Table II.

TABLE II

| | |
|---|---|
| Breadcrumbs | When viewing any retention action screen, breadcrumbs appear at the top (although below the model selection bar and main top navigation) and bottom of the screen. Breadcrumbs start with the student's name as a link to the Student Detail. |
| Student Overview | The student info box, as shown on the Student Detail screen. As on the Student Detail, some parts of the Retention Status information may not display depending on the viewing user's permissions settings. On all "view action" screens, the student's name and photo link to their Student Detail page. The link at the bottom of the Retention Status is also a link to the Student Detail and reads View {student name}'s full retention report" |
| Retention Action buttons | To avoid confusion between adding Interventions and assigning follow-ups to the student in general and to the specific alert, the buttons for these actions do not appear at the top. Only the Email {student name} button displays. User's can use one of the links to the Student Detail to add other actions for the student in general. |
| Early Alert for {student name} | All of the information from the Early Alert. The email icon next to the submitter's name links to the email screen to send an email to that person. |
| State | Either Open or Closed with appropriate icon. Close Early Alert button only displays for users with Model-Based navigation (retention administrators/managers/staff) |
| Follow-Up Assignments | If a user has been assigned to follow up with the student about this Early Alert, the Follow-Up Assignment is displayed. If more than one Follow-Up has been assigned, they are listed here from most recent to oldest. Below this information, or in place of it if no follow-ups have been assigned, a link button to Assign Follow-Up - To an Early Alert is displayed. |
| Interventions | If intervention(s) have been added either at submission of the Early Alert or later, they are listed. Below this information, or in place of it if no Interventions have been added, a link button to Add Intervention - To an Early Alert is displayed. |

Figure 9:
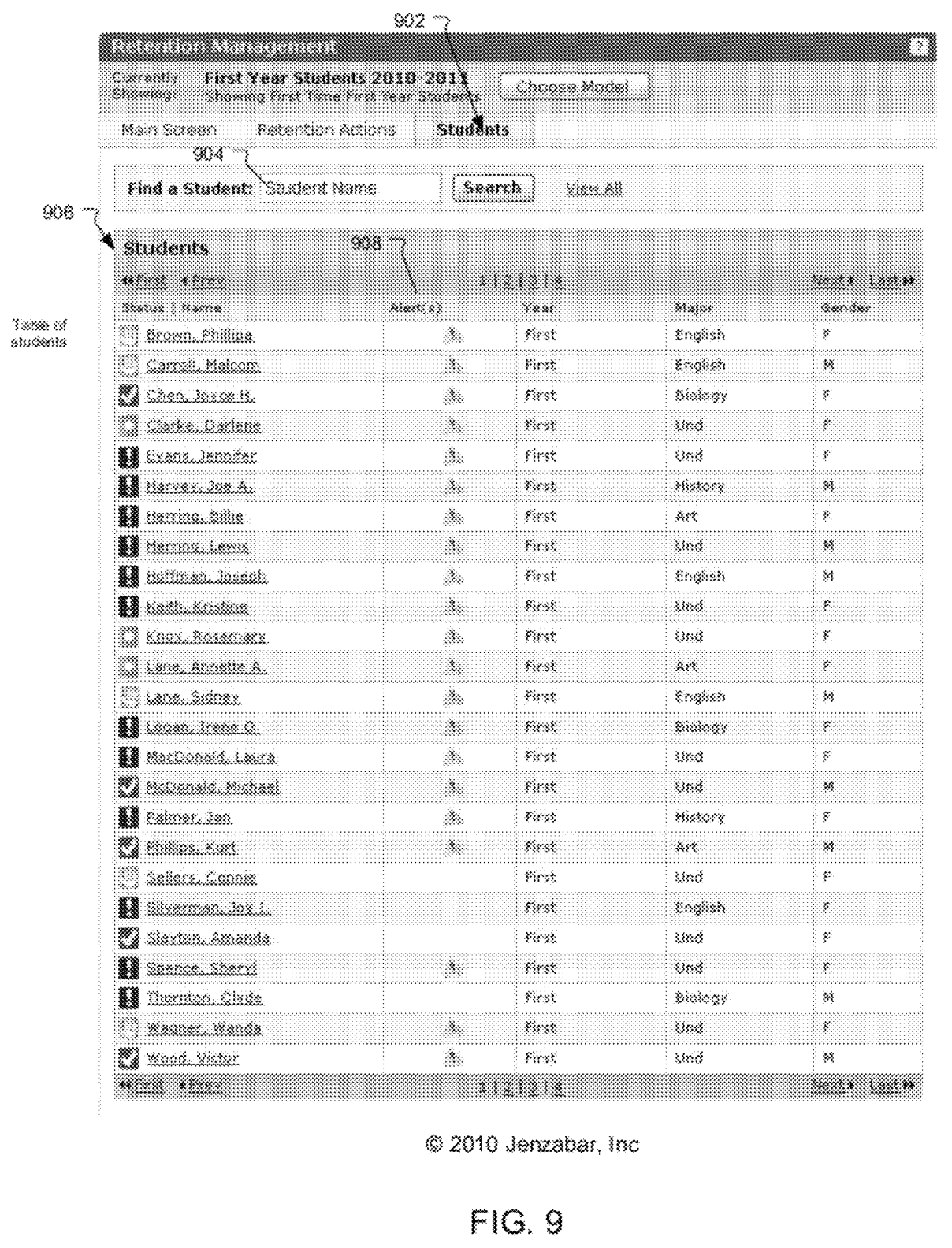

FIG. 9 shows the student list tab screen 902. The student list tab screen 902 shows all of the students that are part of the selected retention model and that the user has permission to access. From this screen, a user is able to able to view a student profile by selecting the student's name, which is displayed as a link. If any students have alerts they are displayed in an alerts column 908 of the student table 906.

Additionally, a search box 904 for searching student names is provided. Typically, the search box contains the default value 'Student Name', which will clear on focus and re-appear if the field is left blank and focus is lost. In operation, searching for a student name refines the table of students 906 to display only results of the search. If the search does not yield any results an error message of "No students were found with the name {entered name}" is displayed. A Further explanation of the student list tab screen 902 is provided in Table III.

TABLE III

| | |
|---|---|
| Find a Student | A search box for searching student names. It contains the default value Student Name which will clear on focus and re-appear if the field is left blank and focus is lost. Search button does not do anything if clicked when Student Name is populated in the field. Searching for a student name refines the student table below to show only results of the search or "No students were found with the name {entered name}" |

TABLE III-continued

| | |
|---|---|
| | View All link clears the search criteria and goes back to viewing all permitted (by permissions) and relevant (by model or group choice) students available. |
| Students table | This is paginated after 25 students. Default sort order for this table should be by alphabetically by last name. |
| | Status \| Name Displays the model category icon for the student's retention status (High Risk, At Risk, etc . . . ) and then the student's name linked to each student's Student Detail. |
| | Early Alert(s) Displays an Alert icon if any Early Alerts have been submitted for the student |
| | Year Displays the student's year. |
| | Major Displays the student's major. |
| | Gender Displays the student's gender. |

Figure 10:
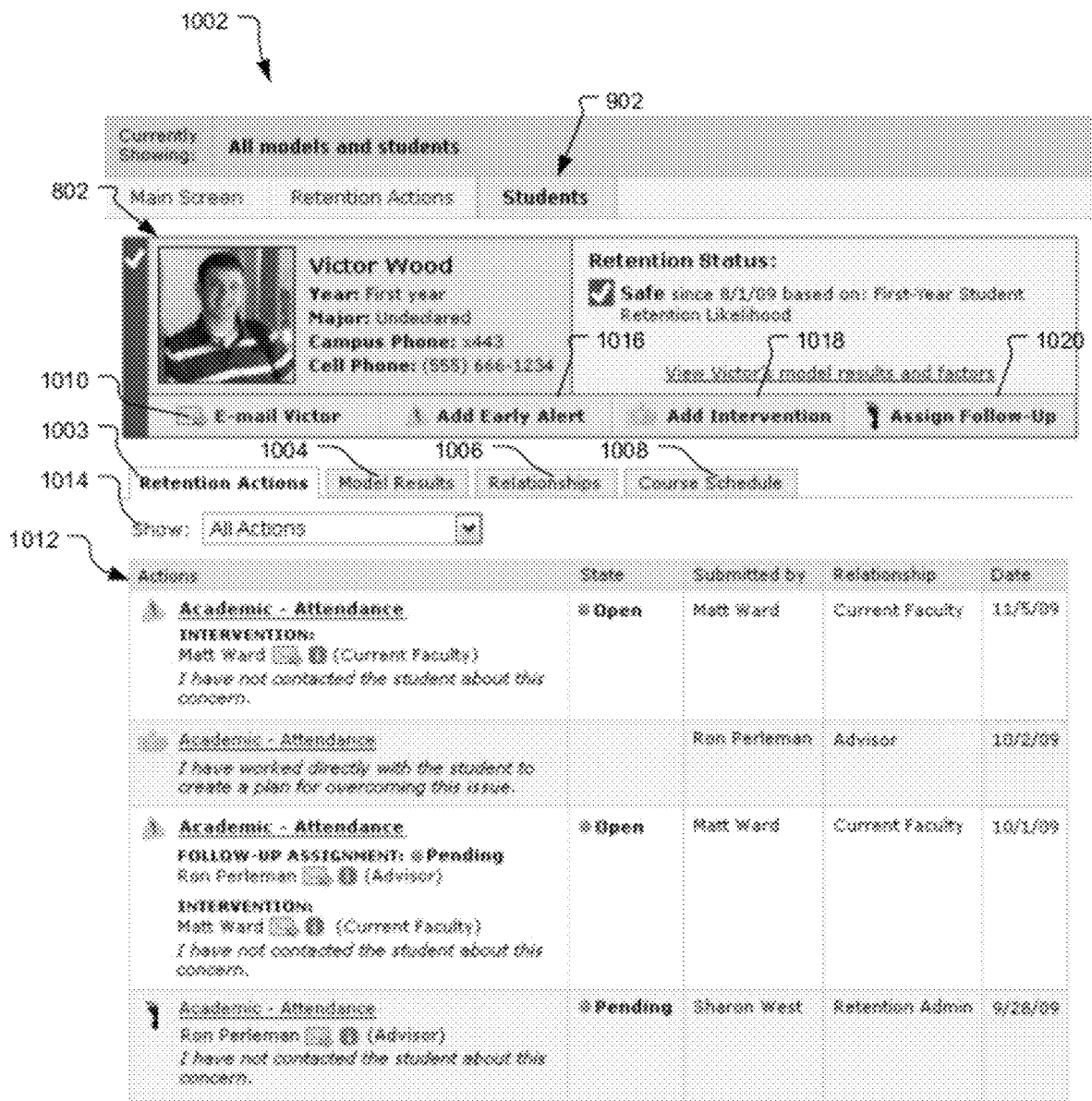
FIG. 10 shows the student profile tab screen.

FIG. 10 shows the student profile tab screen 1002. The student profile tab screen 1002 provides information about the selected student in the student overview 802. From this window a user is able to email the student 1010 and view or access the other tab screens related to the student profile tab screen 1002. For example, a user is able to navigate to the retention actions tab screen 1003, model results tab screen 1004, student relationships tab screen 1006, and course schedule tab screen 1008. Additionally, links are provided to add an early alert 1016, add an intervention 1018, or assign a follow-up 1020.

A detailed description of the retention action table 1012 is provided in Table IV.

TABLE IV

| | | |
|---|---|---|
| Retention Actions tab | A table showing the all submitted retention actions for the student. Default sort is by date, newest to oldest. | |
| | Show pull-down | Filters the table below based on the type of retention action. Pull-down Contains: "All Actions" "Alerts" "Interventions" "Follow-Up Assignments" |
| | Type | The type of the Action, as a link to the View Action (Early Alert, Intervention, or Follow-Up Assignment) screen. As with other places, Early Alerts with a High risk assessment are displayed in bold. For Early Alerts, any Interventions or Follow-Ups assigned or performed to that particular action should be listed with pertinent information (user who performed it with info and contact links, state for follow-ups, intervention type for interventions) below the Type as shown in the screenshot. |
| | State | Displays the state of the Action (for Alerts and Follow-Up Assignments). |
| | Submitted By | The name of the submitter |
| | Relationship | The relationship given when the action was submitted. |
| | Date | The date the action was submitted |

Figure 11:
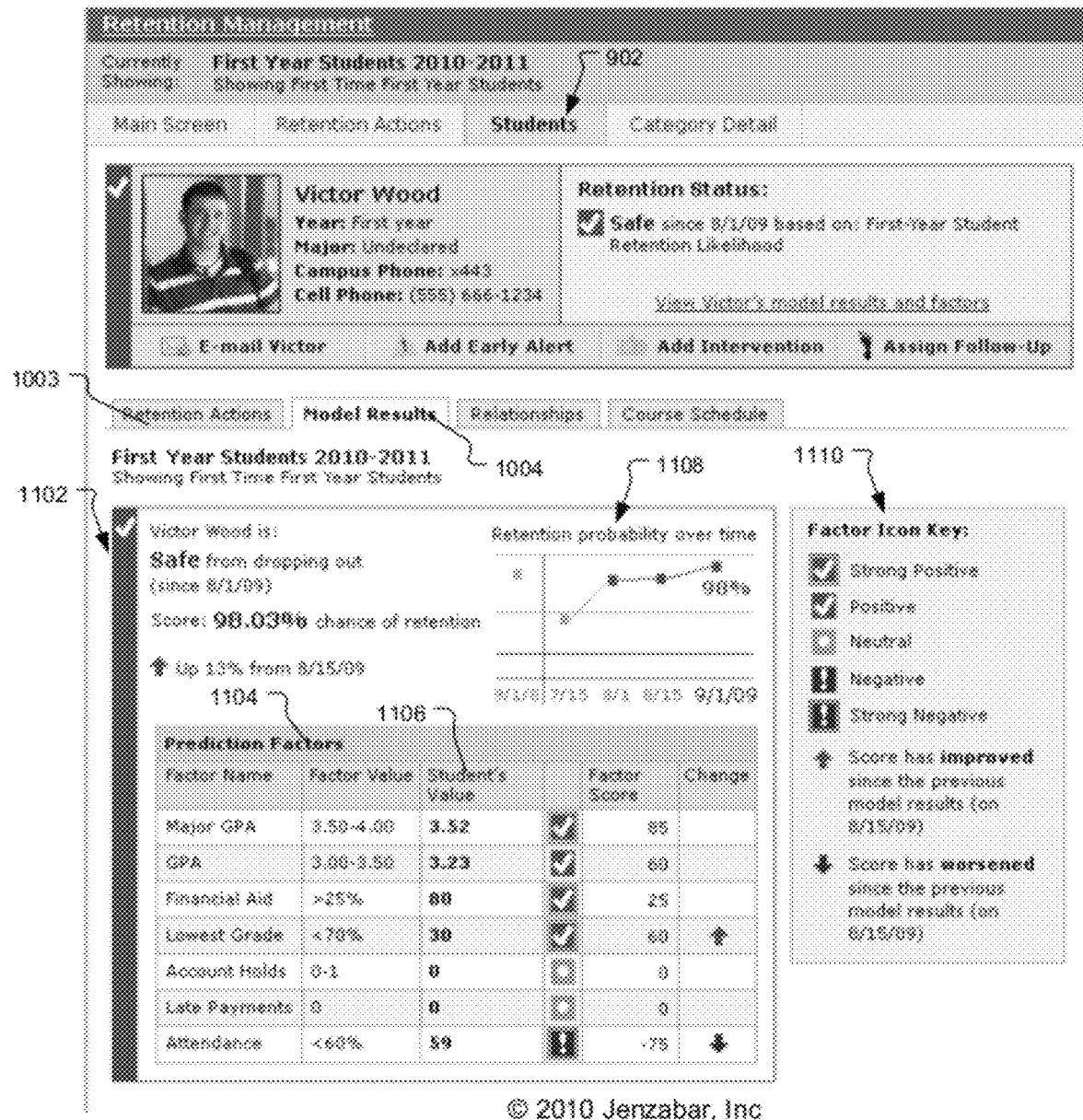
FIG. 11 shows the model results tab screen.

FIG. 11 shows the model result tab screen 1004. The model result tab screen 1004 provides details of how the student is performing based on the retention model.

The model results table 1102 provides detailed information about retention model including the risk factors 1104 used in the model, the student's score 1106, as well as a chart or line graph 1108 that shows the retention probability over time for the selected student. Additionally, a factor icon key 1110 is also provided to help explain the pictorial symbols (positive or negative) used in the model results table. For example, it is clear that a student GPA of 3.52 is a strong positive indicator based on the factor icon key 1110. Likewise, it is also possible see that the student's attendance score has worsened over time. A further description model results table 1102 is provided in Table V.

TABLE V

| | |
|---|---|
| Model Results tab | Details of this student's results from the model (if any). If the user does not have permission to view model information at all, this tab does not display. If the student has not been modeled this tab does not display. |
| Model info | Displays the model, students in the model, and prediction report date. |
| Name | The name, date, and included students from the model. |
| Score | Category, score, and score change information for the student. The icon and "sidebar" color are based on the category the student is in. (display of score is controlled by Student scores and factor values control in Config - Role Settings) |
| Chart | A chart showing the student's current and historical scoring in this model. |
| | The factor table(s) display all of the factors used for predictions. |
| Factors | The factors in the model. |
| Factor Value | The Factor Value range the student was categorized into. |
| Student Value | The student's specific value for the factor. (display of student value is controlled by Student scores and factor values control in Config - Role Settings) |
| Icon | Factor icons are shown based on the factor score. |
| Factor Score | The factor score. (display of weight is controlled by Student scores and factor values control in Config - Role Settings) |
| Change | If a student's value changed between the most recent report and the previous report, an up or down icon displays indicating the change. |

Figure 12:
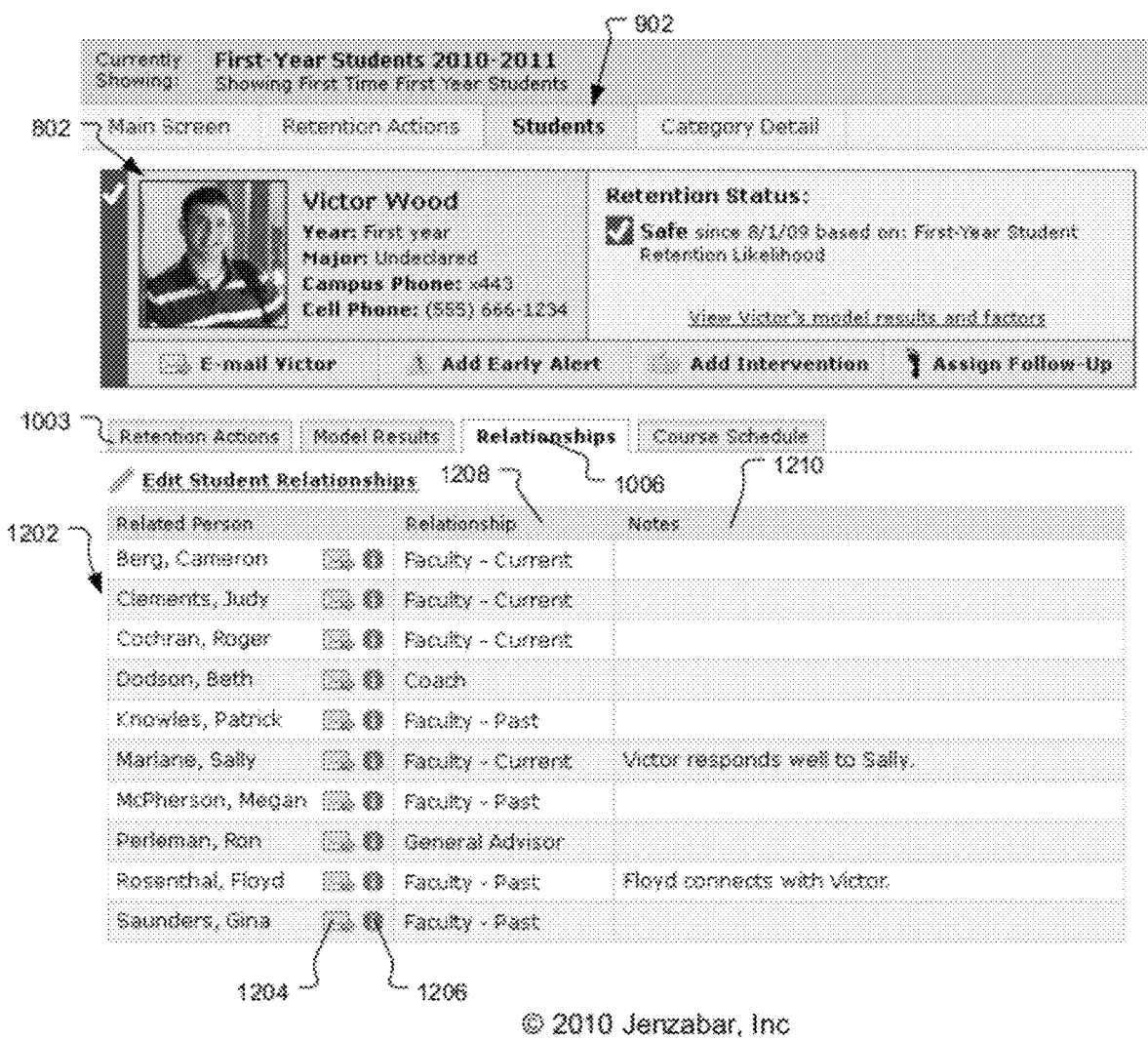
FIG. 12 shows the student relationships tab screen.

FIG. 12 shows the student relationships tab screen 1006. From this screen users edit student relationships by adding, removing or editing the current relationships. The student relationships tab screen 1006 displays users, which are typically faculty members, coaches, or advisors, who have a meaningful relationship with the student and might be helpful in regards to retention matters.

The relationship table 1202 allows the user to email the related person 1204 or see additionally information 1206. Additionally, the type of relationship 1208 and supplemental notes 1210 are also displayed.

Figure 13:
FIG. 13 shows the course schedule tab screen.

FIG. 13 shows the course schedule tab screen 1008. The course schedule tab screen 1008 displays the student's active courses for the current term as retrieved from the LMS 110. Likewise, the course schedule tab screen displays the student's current grade and attendance, and provides a link to email the faculty member teaching the course.

If the student has an early alert in one their courses, an early alert icon 1302 provides a link to view the early alert message. Additionally, if there is more than one warning for a single course, the early alert icon links to a "View All Messages" screen showing additional alerts for the students and courses.

FIG. 14A illustrates an example of an early alert submission form 1402. From this screen users are able to submit early alerts for students. In a typical implementation, a user first selects a student and then creates an early alert for the selected student. In this scenario, breadcrumbs 1404 are displayed at the top of the screen with the student's name and the type of retention action being created to allow users to keep track of their location within the many different screens of the portlet.

In operation, a user selects information from drop-down menus 1405 to provide information about the relationship with the student, the concern type, the relevant course, the risk assessment, and additional notes and details describing the basis for the alert submission. These drop-down menus are populated with options that are created by retention managers using the configuration options of the RMS 106. Additionally, the user is also able to enter additional details or notes regarding the early alert.

The early alert submission form also includes an intervention section 1406 that allows the user to supply information about intervention actions that have been performed in relation to the early alert. For example, if a professor talked to a student about their grades, the professor would include that information when creating the early alert by selecting the corresponding radio button 1403 and adding additional details and notes in the area provided. Specifically, that nature of any intervention is described along with the student response: no response, student did not agree that there was an issue, the student appears in a place to move forward, or a plan was created for overcoming the issue.

FIG. 14B illustrates an example of an intervention submission form 1408. The intervention submission form 1408 contains the same content as the intervention section 1406 of the early alert submission form screen 1402 allowing the institutional personnel to indicate whether contact was made and the student's response along with the addition of notes and details. It also includes relationship, concern type, and relevant course pull-downs 1407.

When adding an intervention to an existing early alert, the concern type drop down menu is replaced with a link (not shown) that is directed back to the alert. Likewise, the relevant course is populated with the value from the previous alert the intervention is being added for.

Additionally, breadcrumbs 1410 at the top of the screen include the student's name and the type of retention action being created.

Figure 14C:
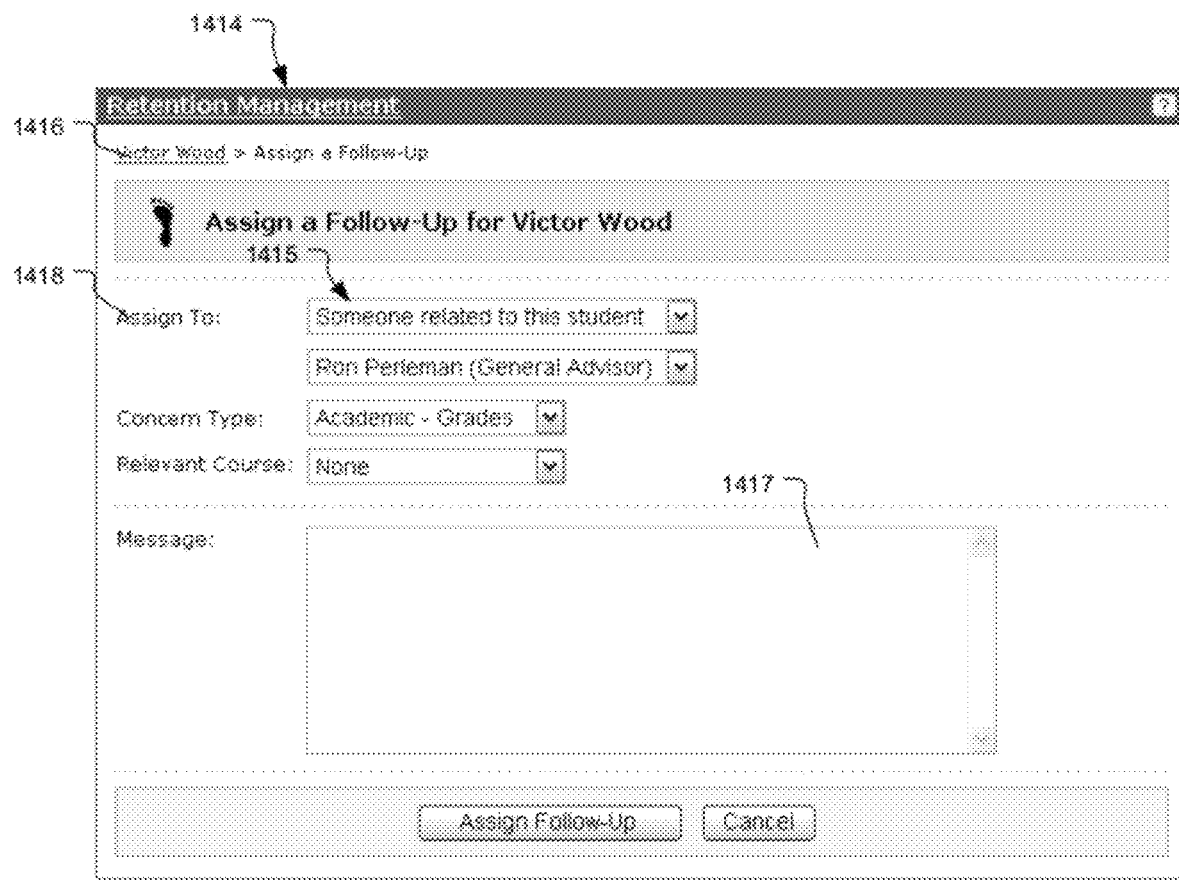
FIG. 14C illustrates an example a follow-up assignment submission form.

FIG. 14C illustrates an example a follow-up assignment submission form 1414. The follow-up assignment submission form 1414 allows users to assign follow-ups for an early alert or intervention. The follow-up can be assigned to the same person that received the early alert, one of the people listed in the student relationship tab or the follow-up can to someone different.

In operation, the user selects the options from the drop-down menus 1415 and provides a message in the message space 1417 for the person receiving the follow up assignment.

Typically, the default option for the assign to drop-down menu 1418 is to select someone that is listed as having a relationship with the student. Similarly, the second drop-down menu defaults to the student's primary advisor. However, if the student does not have anyone listed in the student relationships tab screen 1006, a message displays, "There are no relationships saved for this user. Please choose another option." Alternatively, the user is able to assign the follow-up to a specific person not listed in the relationship tab.

After a follow-up is assigned, a notification email is sent to the assigned person containing a link to view the follow-up assignment. Breadcrumbs 1416 appear at the top of the screen to display the name of student and the type of retention action.

Figure 15:
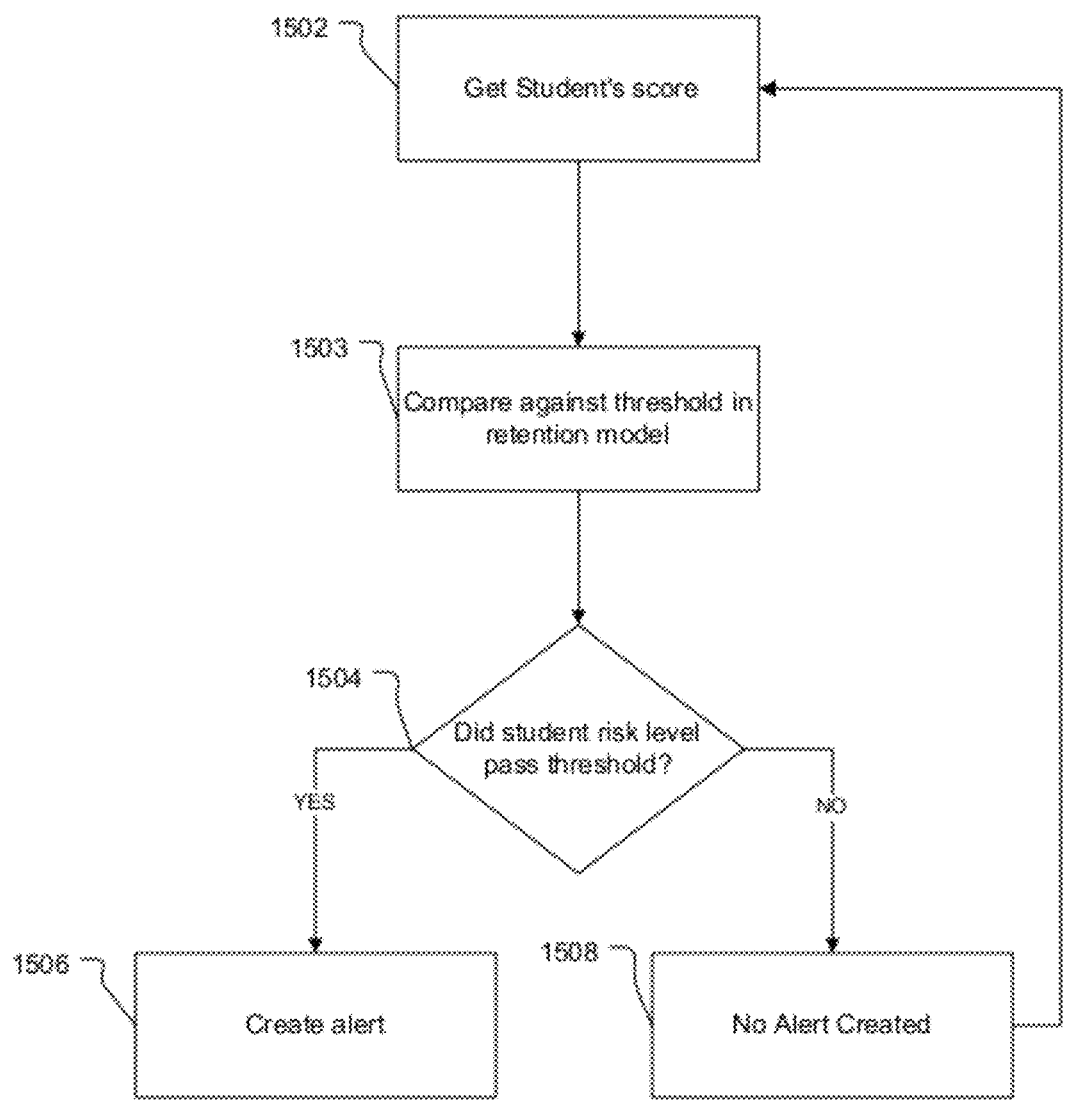
FIG. 15 is a flowchart illustrating the steps for automatically generating alerts.

FIG. 15 is a flowchart illustrating the steps executed by the RMS 106 for automatically generating alerts. In a preferred embodiment, the automatic alerts are generated when a student passes a set threshold of a single risk factor. In an alternative embodiment, the automatic alerts are generated based on the totality of multiple risk factors.

In the first step 1502, the RMS 106 gets the student's score for the risk factors by retrieving the information from the ERP system 108 or the LMS 110. In the next step 1503, the student's score is compared against the set threshold value defined in the selected retention model. In the next step 1504, the RMS 106 determines if the student's risk level passed the set threshold of the risk factor. If the student's score passes the set threshold, then an alert is created in step 1506. If the student score did not pass the set threshold then an alert is not created in step 1508 and the process is repeated for the other risk factors.

Passing the threshold defines when a student's score for a particular risk is no longer within the ideal range. For example, an alert monitoring student grade point average (GPA) from the LMS 110 is concerned with monitoring GPAs that are too low because a low GPA indicates that a student is not doing well in their classes. Conversely, an alert monitoring attendance is concerned with monitoring too many missed classes because poor attendance leads to missing lectures, missing assignments, missing exams, and poor grades.

In other embodiments, the alert is generated from information contained in the ERP system 108. In one example, the system looks for payment history, late payments or default on payments, outstanding balances, or loss of student aid and compares this ERP data against the retention model. Alerts are then generated based on data that are predictive of possible attrition.

Figure 16:
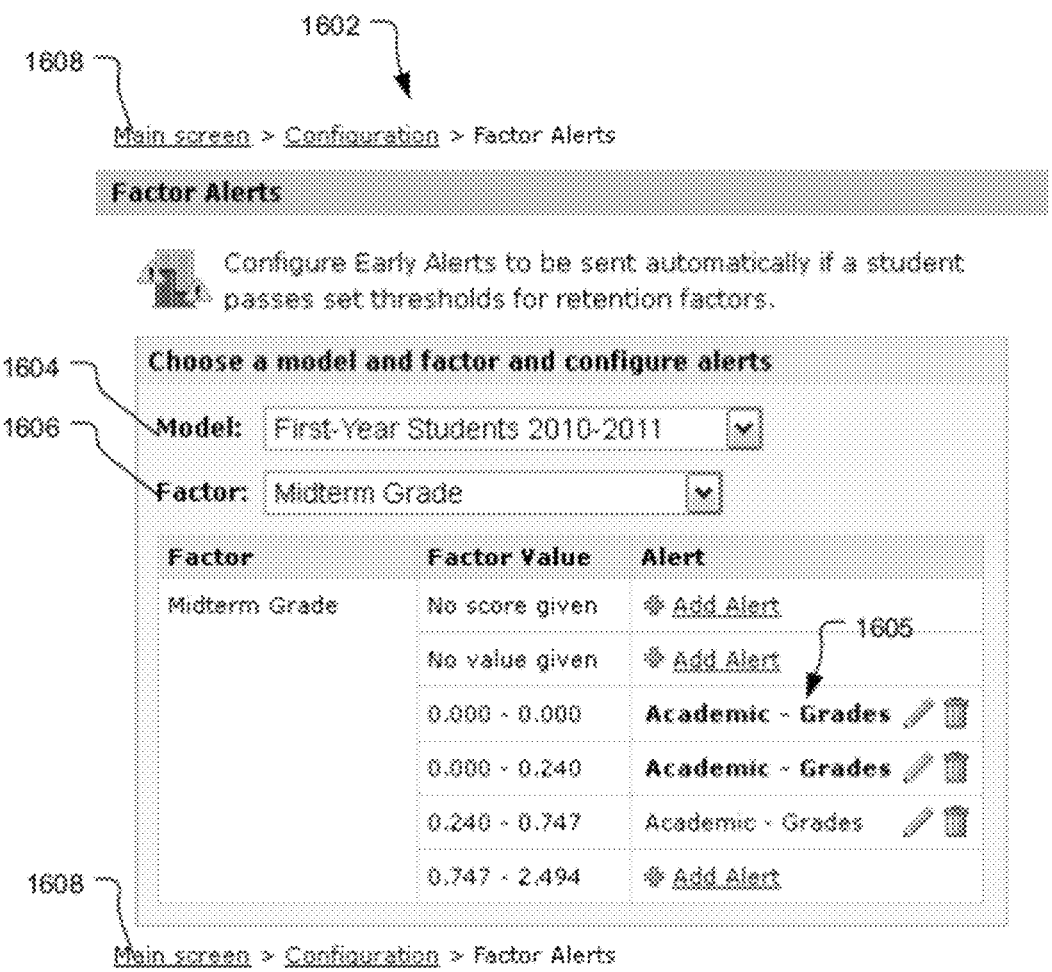
FIG. 16 shows screen providing an example of how to configure an automatically generated alert.

FIG. 16 shows an example of how to configure an automatically generated alert. The factor alerts screen 1602 allows the personnel assigned to operation the retention management system to configure the portlet so that the RMS 106 generates an early alert that is sent automatically if student's score for a risk factor passes set thresholds for retention factors. In other examples, these risk factors are determined by data mining or regression analysis to develop a model as describes previously.

In a typical implementation, a user selects a retention model and risk factor from the drop-down menus 1604, 1606. The user then defines the thresholds for the selected risk factor in the retention factor table 1605. Breadcrumbs 1608 are displayed at the top and bottom of the screen to aid the user in navigating.

By way of example, the selected retention model is for first year students in the 2010-2011 school year. The risk factor being monitored is for midterm grades. The alert has been configured to generate an automatic alert for 'Academic—Grades' if any students have midterm grades that pass the set thresholds.

Figure 17:
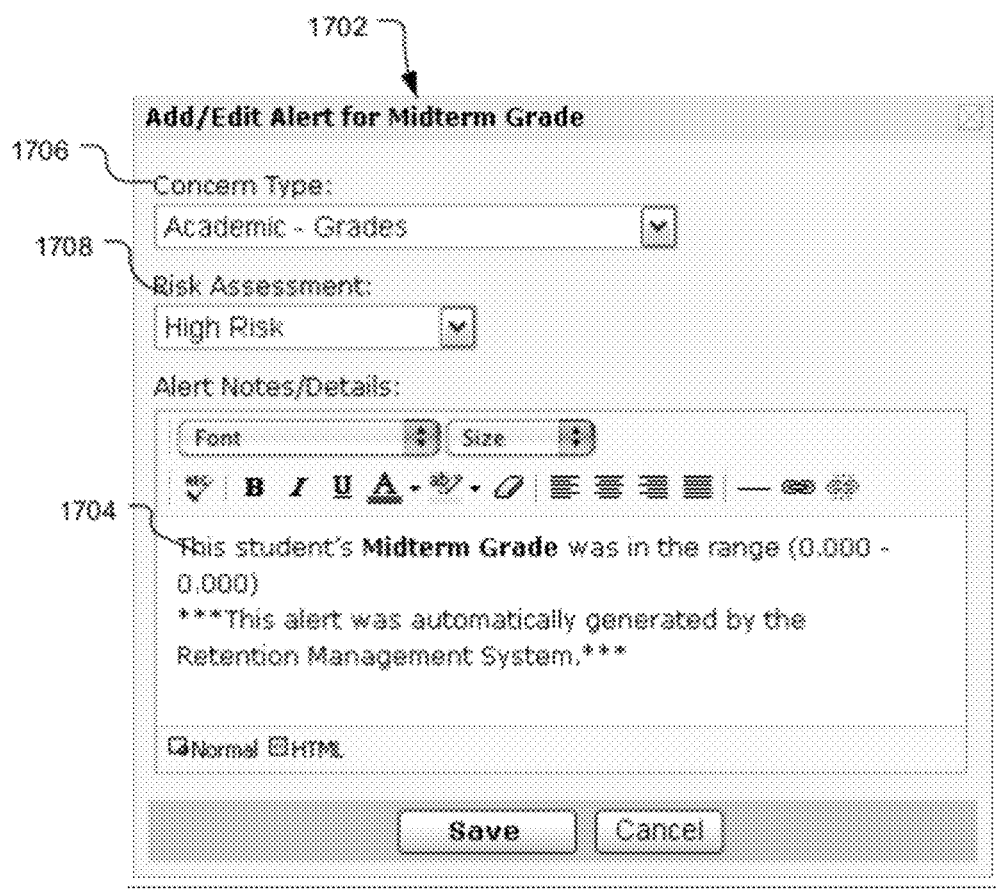
FIG. 17 shows screen illustrating an example an alert message associated with an automatically generated alert.

FIG. 17 shows an example an alert message 1702 associated with an automatically generated alert 1602. The user selects the concern type and risk assessment from drop-down menus 1706, 1708. The user is able to compose a customized message 1704 to explain why the automatic alert was generated.

Figure 18:
FIG. 18 shows a screen illustrating an example of an automatically generated alert.

FIG. 18 illustrates an example of an automatically generated alert 1802. This automatically generated early alert is for a student with an outstanding balance greater than $10,000 1808.

The automatically generated alerts are created for the many different risk factors of the different retention models. The automatically generated alerts provide an automated system and process of identifying students in danger. In this screen, the institutional personnel is able to add an intervention 1810 and assign and follow-up 1812.

Figure 19:
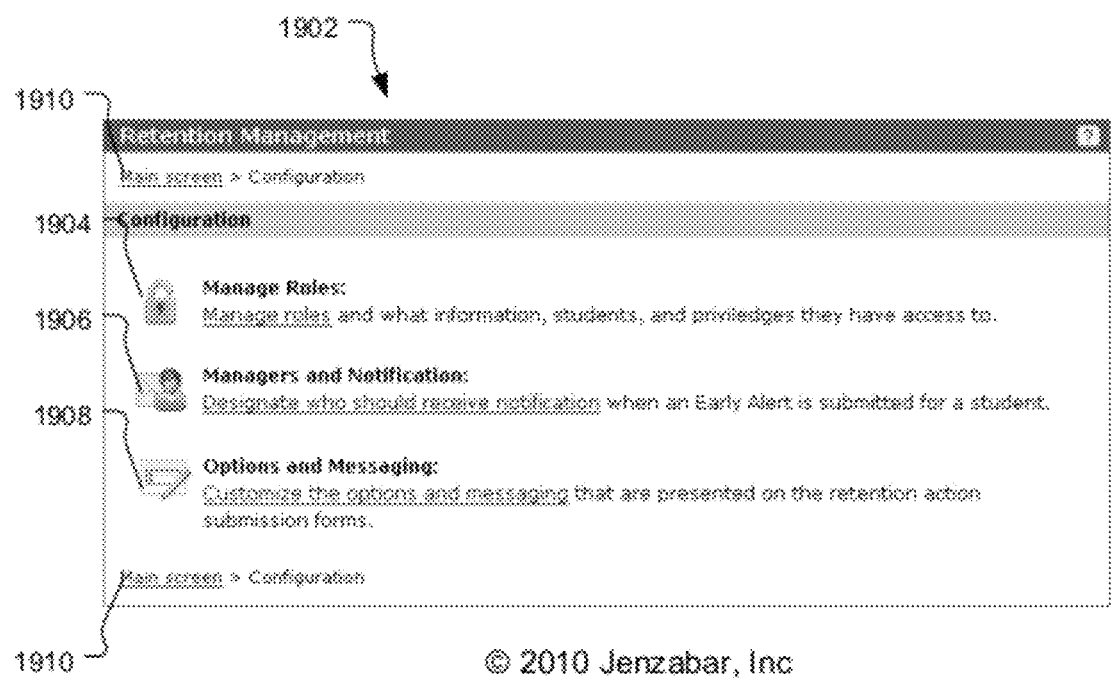
FIG. 19 shows the early warning configuration screen.

FIG. 19 shows the early warning configuration screen 1902. From this screen a user is able to configure all of the options and selection choices within the RMS 106. The main configuration screen allows users to manage roles 1904, configure managers and notification 1906, and configure options and messaging 1608. Breadcrumbs 1910 are displayed at the top and bottom of the screen 1902.

This screen is a gateway to the other option screens that allow the user to configure nearly all the aspects of the RMS system.

Figure 20:
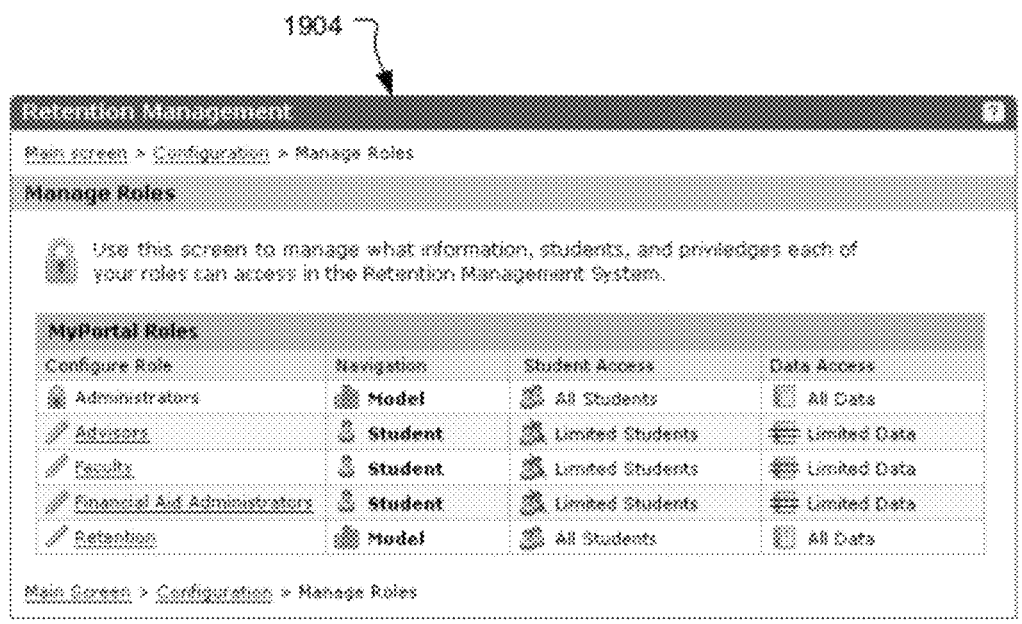
FIG. 20 shows screen illustrating how different members of the university are granted different access levels to the retention management system based on their role within the university.

FIG. 20 shows how different members of the university are granted different access levels to the retention management system based on their role within the university. The manage roles screen 1904 displays different groups of users that have different levels of access to the RMS 106. For example, the retention managers and school administrators are able to see information for all students and all the data associated with those students. Financial aid administrators and faculty members, however, have limited access to students and limited access to the student data.

Figure 21:
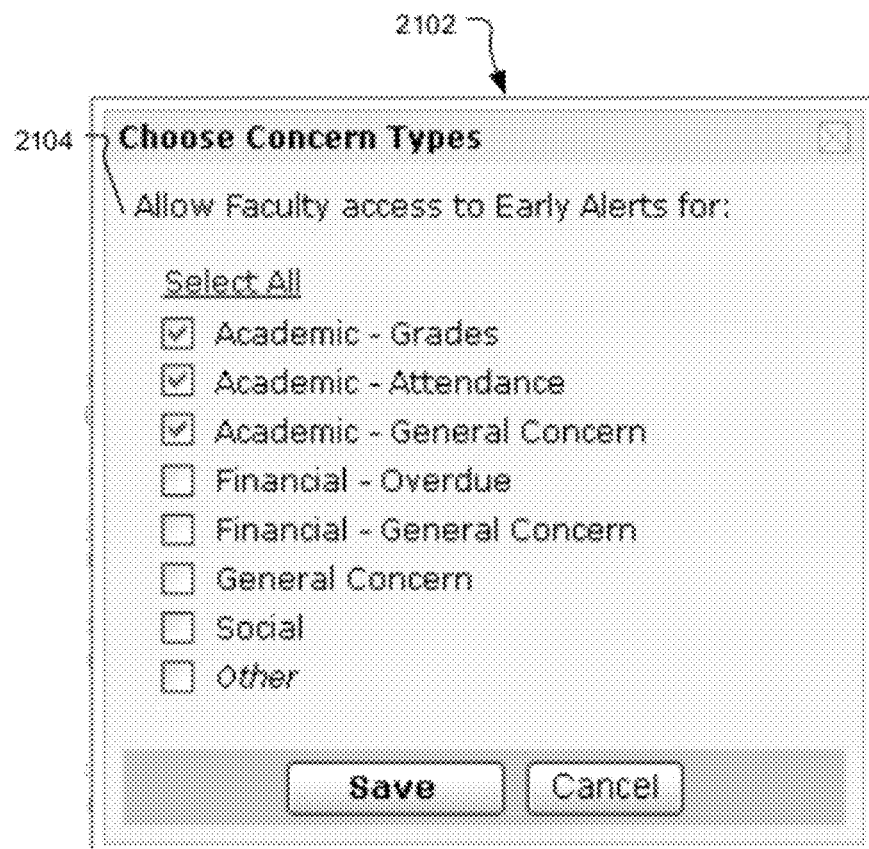
FIG. 21 shows screen illustrating an example of how concern types are configured.

FIG. 21 shows an example of how concern types are configured. A popup 2102 is populated with all the concern types as defined by the users. The popup is launched from any of the configuration screens with a 'Choose Concern Type' link (not shown). This popup is used to configure access to early alerts for a particular group within the university. The top text line 2104 displays the name of the group and the type of retention action being configured with the popup 2102. For example, the access for faculty members only permits access to early alerts submitted for academic issues. Additionally, if all checkboxes are selected, the 'Select All' link toggles to 'Deselect All'.

Figure 22:
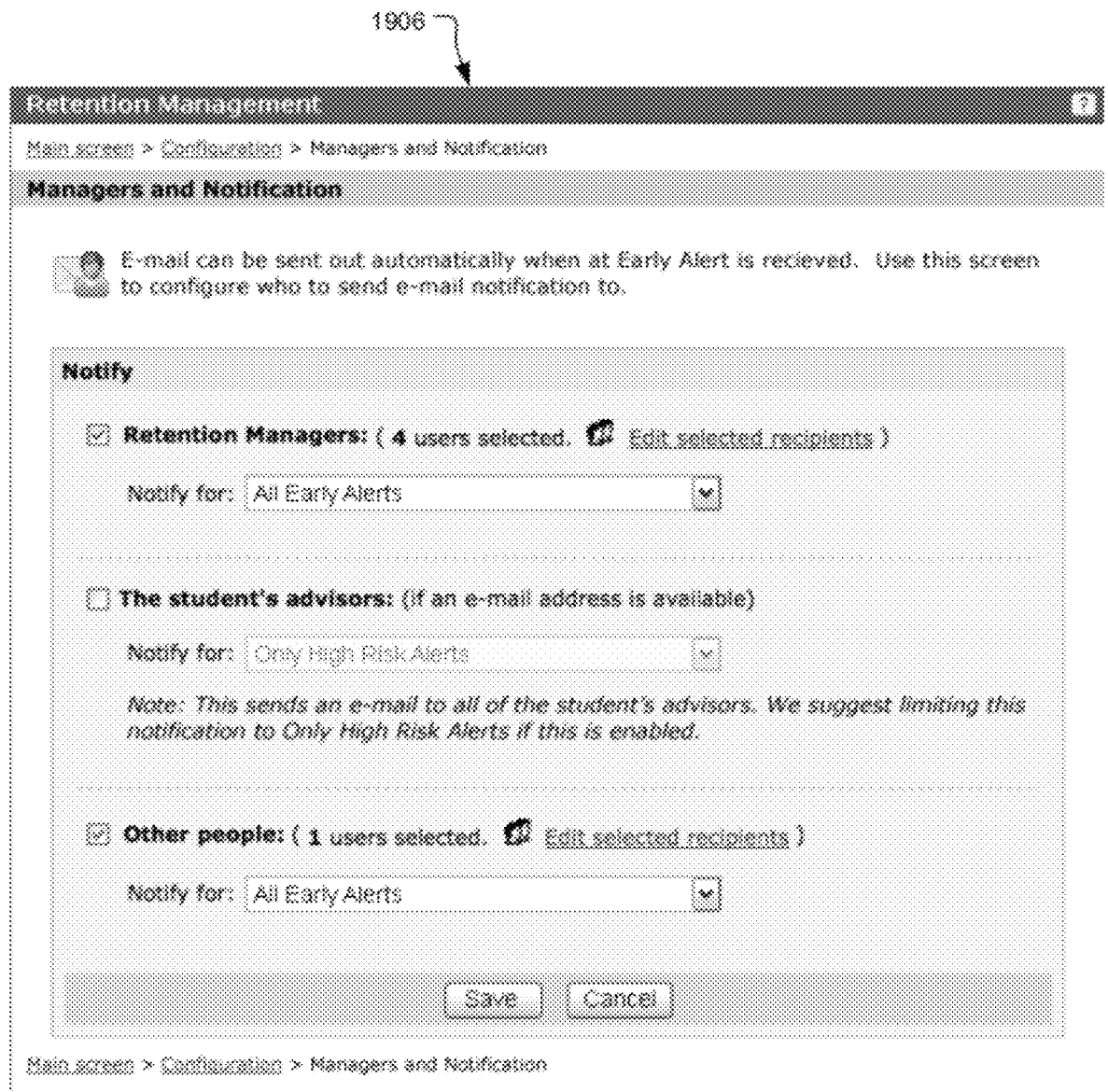
FIG. 22 shows screen illustrating an example of how notifications are configured for different people.

FIG. 22 shows an example of how notifications are configured for different people. The managers and notification screen 1906 is used to set up the notification framework for the RMS 106. Users are able to determine who receive a notification when an early alert is submitted. For example, retention manager receive notifications for all early alerts. Financial aid administrators, however, only receive alerts for financial aid issues. A further explanation is provided in Table VI.

TABLE VI

| | |
|---|---|
| Notify dropdown | For all three types, this dropdown menu contains the following options:<br>"All Early Alerts"<br>"Only Moderate and High Risk Alerts"<br>"Only High Risk Alerts" |
| Advisors | When selected, the student's advisor is dynamically determined and will receive an email when messages are submitted for the student.<br>The notify menu defaults to "Only High Risk warnings" for this option. |
| Others | A user selector to select other users individually. |
| Save and Cancel buttons | Clicking 'Save' saves the settings and returns the user to the Configuration main screen. Clicking Cancel resets the settings to what they were when the user entered the screen and returns the user to the Configuration main screen. |

While this invention has been particularly shown and described with references to preferred embodiments thereof, it will be understood by those skilled in the art that various changes in form and details may be made therein without departing from the scope of the invention encompassed by the appended claims.

What is claimed is:

1. A student retention management method in an academic retention management system, the method comprising:

generating an add intervention screen of a user interface system of the academic retention management system on a user computing device enabling users to create interventions concerning retention issues for students and to specify student responses to the interventions in the academic retention management system;

generating an interventions screen of the user interface system on the user computing device including a table of actions that lists the interventions, a concern type of each of the interventions, a student name for each of the interventions, a person performing each of the intervention, a relationship of the person to the student and a date of each of the interventions on user computing devices to institutional personnel; and the user computing device enabling users to submit interventions in the user interface that is displayed on the user computing devices, wherein the add interventions screen of the user interface includes a region enabling users to specify a relationship with the students, a status of attempts to contact the students, and textual notes concerning the intervention.

2. A method as claimed in claim 1, wherein the interventions screen displays interventions actions viewable by users based on a selected retention model, students within the model, and the permission levels of the users.

3. A method as claimed in claim 1, wherein the interventions screen displays pending interventions.

4. A method as claimed in claim 1, wherein the interventions screen display includes a search field to search by student names or message description.

5. A method as claimed in claim 1, further comprising generating follow-up an assignment submission screen of the user interface system on the user computing device enabling the users to assign follow-ups for an intervention.

* * * * *